US006573974B1

(12) United States Patent
Ikeda et al.

(10) Patent No.: US 6,573,974 B1
(45) **Date of Patent: *Jun. 3, 2003**

(54) IMAGE FORMING APPARATUS CAPABLE OF PRODUCING HIGH-QUALITY BOUND DOCUMENTS OF ANY THICKNESS

(75) Inventors: Hiroaki Ikeda, Toyokawa (JP); Akinori Yoshida, Nishio (JP); Motomi Takemoto, Toyokawa (JP); Koji Naito, Toyohashi (JP); Hiroshi Sumiyama, Toyokawa (JP); Masami Toyama, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,795

(22) Filed: Sep. 28, 1998

(30) Foreign Application Priority Data

Sep. 27, 1997 (JP) ........................................ 9-279975
Mar. 21, 1998 (JP) ........................................ 10-092739

(51) Int. Cl.[7] ........................ G03B 27/32; G03B 27/52; B26D 5/00; B26D 5/38

(52) U.S. Cl. ............................ 355/25; 355/40; 83/368; 83/370

(58) Field of Search .......................... 270/52.18, 58.09; 399/408, 382, 410; 412/20; 355/25; 83/368–372, 167

(56) References Cited

U.S. PATENT DOCUMENTS

| | | | | | |
|---|---|---|---|---|---|
| 3,730,560 | A | * | 5/1973 | Abildgaard et al. | 281/21 |
| 5,257,081 | A | | 10/1993 | Kato et al. | 355/324 |
| 5,263,698 | A | * | 11/1993 | Higuchi et al. | 399/408 |
| 5,355,207 | A | * | 10/1994 | Yano et al. | 399/408 |
| 5,717,843 | A | * | 2/1998 | Tabata et al. | 399/408 |
| 5,762,329 | A | * | 6/1998 | Nakazato et al. | 270/58.09 |
| 5,839,336 | A | * | 11/1998 | Yamauchi et al. | 83/167 |
| 6,014,920 | A | * | 1/2000 | Yamauchi et al. | 83/560 |
| 6,065,379 | A | * | 5/2000 | Shinno et al. | 83/30 |
| 6,065,383 | A | * | 5/2000 | Takaishi et al. | 83/368 |

FOREIGN PATENT DOCUMENTS

JP 05-083460 A 4/1993

* cited by examiner

*Primary Examiner*—Henry Hung Nguyen
(74) *Attorney, Agent, or Firm*—Morrison & Foerster LLP

(57) ABSTRACT

An image forming apparatus provided with a function for binding a set of recording sheets by interposing said set of recording sheets between a folded cover sheet. When cover mode is set, the cover sheet is transported in a folding unit. The folding unit is controlled so as to fold said cover sheet into three sections of a front cover, spine and back cover. Content copy sheets are inserted in the folded cover sheet. The image forming apparatus is capable of cleanly binding documents even when the set of recording sheets is thick because the cover sheet can be folded in three.

7 Claims, 26 Drawing Sheets

Non-cover Sheet (Left-opening cover mode)

Non-cover Sheet (Right-opening cover mode)

Cover Sheet 1

Cover Sheet 2

Cover Sheet 3

| | Position A | Position B | Position C |
| --- | --- | --- | --- |
| Selector41 |  |  |  |
| Selector42 |  |  |  |

Cover Sheet 1 transport direction →

Cover Sheet 2 transport direction →

Cover Sheet 3 transport direction →

IMAGE FORMING APPARATUS CAPABLE OF PRODUCING HIGH-QUALITY BOUND DOCUMENTS OF ANY THICKNESS

RELATED APPLICATIONS

This application is based on Application Nos. HEI 9-279975 and 10-92739 filed in Japan, the contents of which are hereby incorporated by reference.

BACKGROUND OF THE INVENTION

1. Field of the Invention

The present invention relates to an image forming apparatus provided with a function for binding a plurality of sheets of printed document images.

2. Description of the Related Art

Conventional image forming apparatuses provided with a document binding function are known, such as that disclosed in U.S. Pat. No. 5,257,081. In this prior art is disclosed a copying apparatus provided with a simple binding function whereby a copy sheet onto which a cover document has been copied is folded in half, a set of copy sheets to which the content documents have been copied are interposed between the two halves of said folded cover sheet on the interior side thereof, and the document is stapled along the fold, as shown in FIG. 20(*a*).

Binding devices are known which have been provided with a binding function whereby a set of copy sheets bearing copy images are interposed between a special cover sheet previously coated with binding paste, which is melted via heat from a heater to produce the bound document shown in FIG. 20(*b*).

The copying apparatus disclosed in U.S. Pat. No. 5,257,081 is disadvantageous, however, inasmuch as when the thickness of the set of copy sheets of the content documents becomes greater, the copy sheets of the content documents protrude from the edges of the copy sheet of the cover document, such that the binding region becomes unsightly.

Furthermore, the operating cost is increased since special cover sheets are required in copying apparatus which bind documents using a special cover sheet coated with pre-applied paste as previously described. A still further disadvantage is the higher cost of the apparatus and increased size of the apparatus due to the requirement of a heater to melt the paste.

SUMMARY OF THE INVENTION

An object of the present invention is to provide an image forming apparatus capable of binding a set of recording sheets on which document images have been printed so as to produce a high quality bound document at low cost regardless of the thickness of said recording sheet set.

These objects are attained by a first aspect of an embodiment of an image forming apparatus binding a set of recording sheets on which document images are printed by interposing said set of recording sheets between a front cover and back cover of cover recording sheets, said image forming apparatus being provided with a folding device folding said cover sheet in a direction perpendicular to the sheet transport direction, and a first fold-control device controlling said folding device so as to fold said cover sheet into three sections of a front cover, spine, and back cover.

The aforesaid image forming apparatus further comprises a second fold-control device controlling said folding device so as to fold said cover sheet recording sheet into two sections of a front cover and a back cover, and a switching device to switch between said first fold-control device and said second fold-control device based on the number of document sheets.

The aforesaid image forming apparatus further comprises a punching unit disposed at a predetermined position in the sheet transport path for punching holes in the cover sheets and recording sheets on which the document images are printed, and a stapling device for stapling the set of recording sheets accommodated between said cover sheets at predetermined positions along the fold of said cover sheet.

A second aspect of an embodiment of the image forming apparatus which finishes recording sheets on which document images are printed provides a punch unit disposed at a predetermined position in the sheet transport path for punching holes in said recording sheets with a specified operation timing, and a punch control device controlling the operation timing of said punching device so as to punch holes in the outside recording sheet and the inside recording sheet, when said sheets are folded in two, at different hole positions.

A third aspect of an embodiment of the image forming apparatus which finishes recording sheets on which document images are printed provides a punch unit disposed at a predetermined position in the sheet transport path for punching holes in the recording sheets with a specified operation timing, and a punching control device controlling the operation timing of said punch so as to punch holes at different positions each predetermined number of sheets.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

Figure 11:
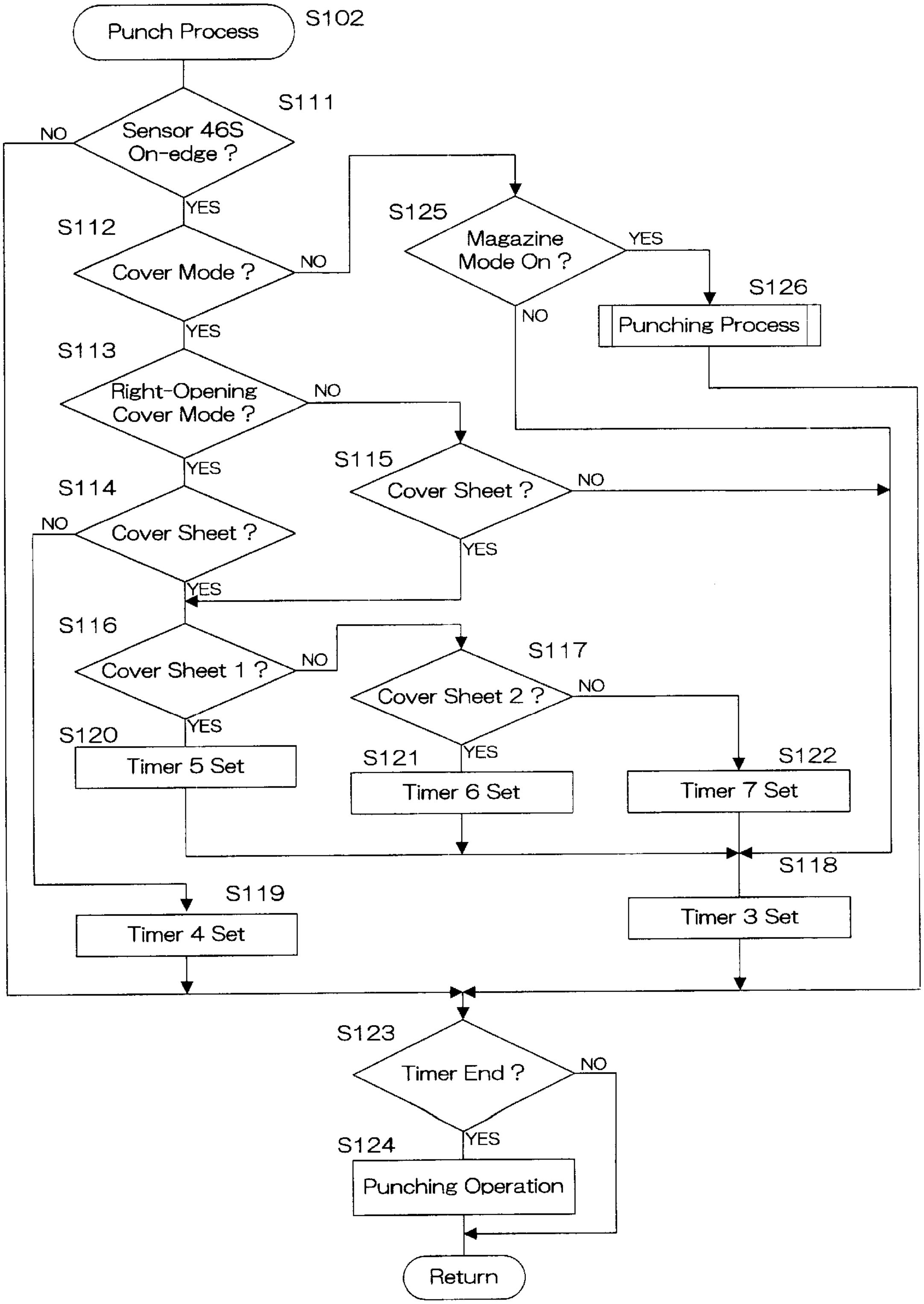
FIG. 11 is a flow chart showing the punch process in FIG. 10.
Figure 12A:
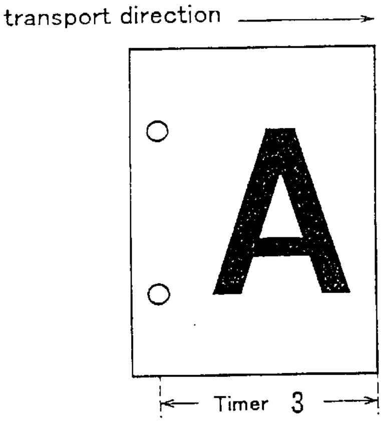
FIGS. 12(*a*),12(*b*),12(*c*),12(*d*) and 12(*e*) illustrates the relationship between each timer and punch hole position in FIG. 11.
Figure 12B:
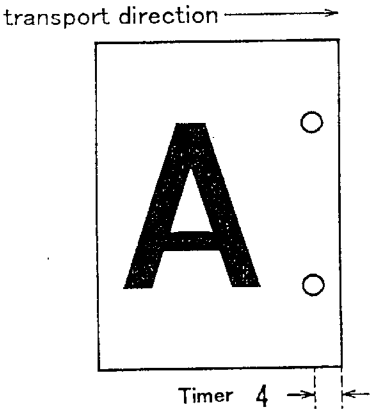
Figure 12C:
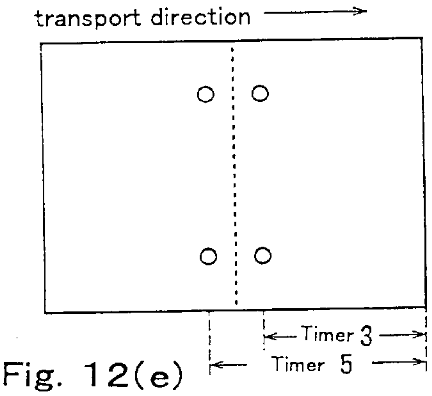
Figure 12D:
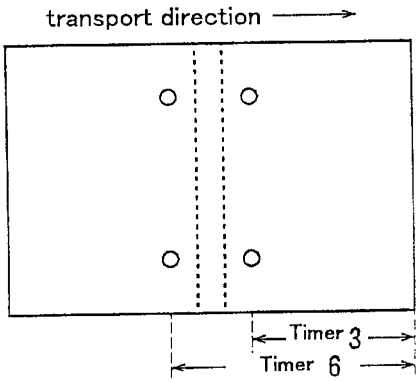
Figure 12E:
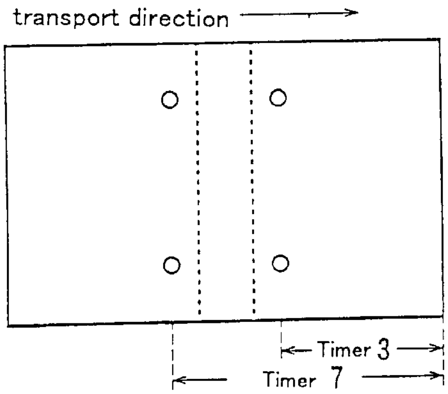
Figure 13:
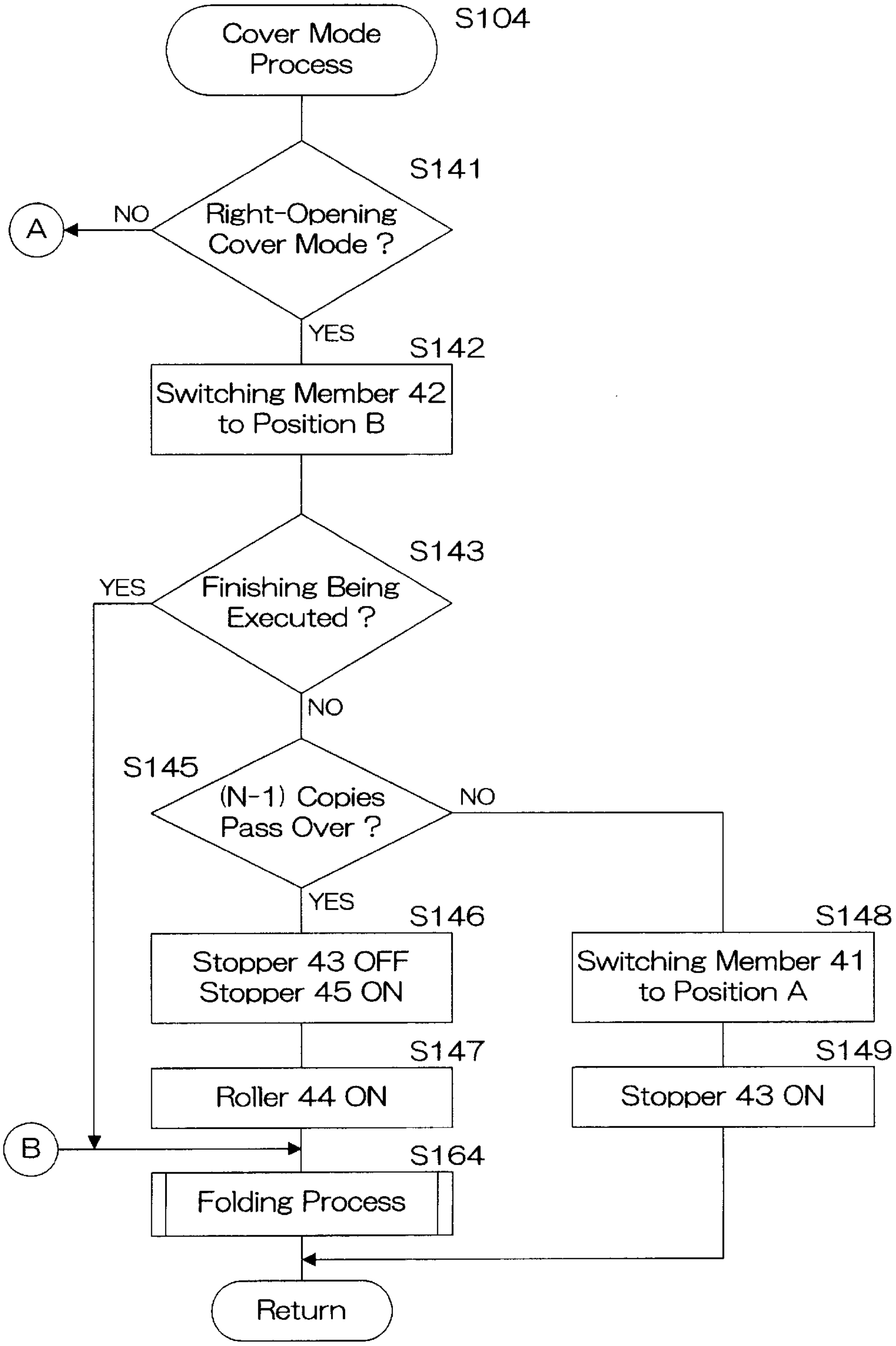
FIGS. 13 and 14 are flow charts showing the cover mode process in FIG. 10.
Figure 14:
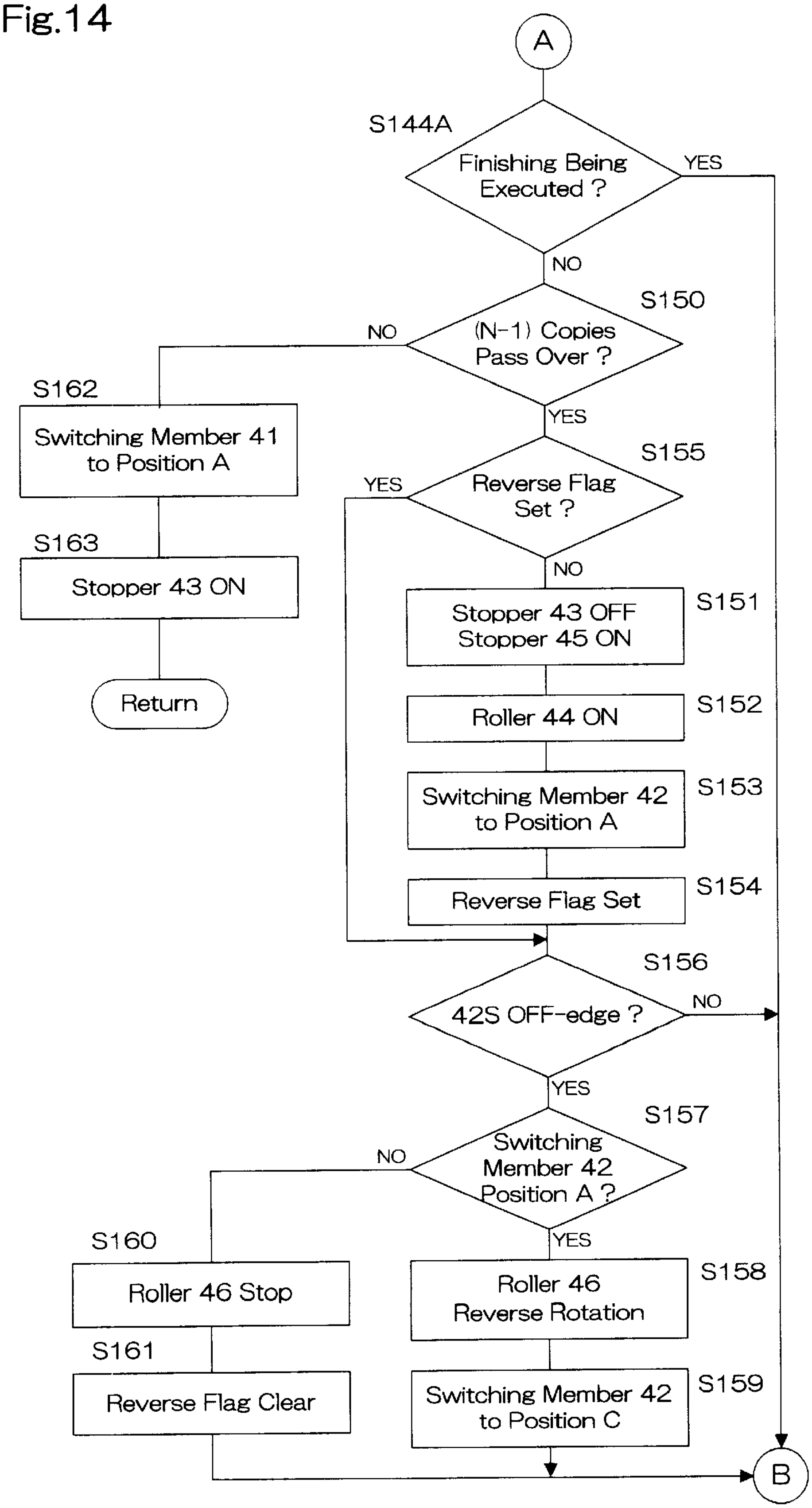
Figure 15:
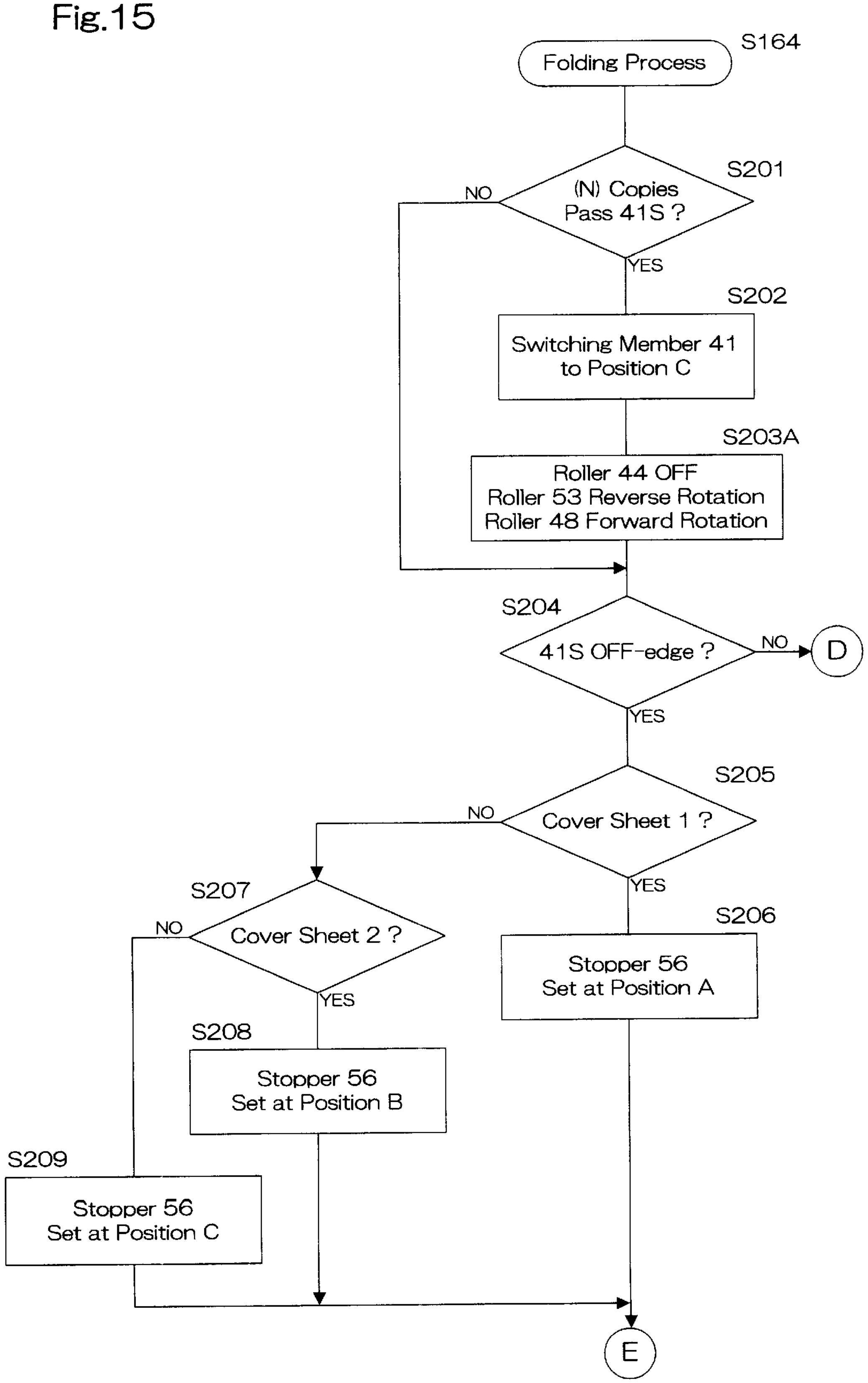
FIGS. 15 and 16 are flow charts showing the insert process in FIG. 13.
Figure 16:
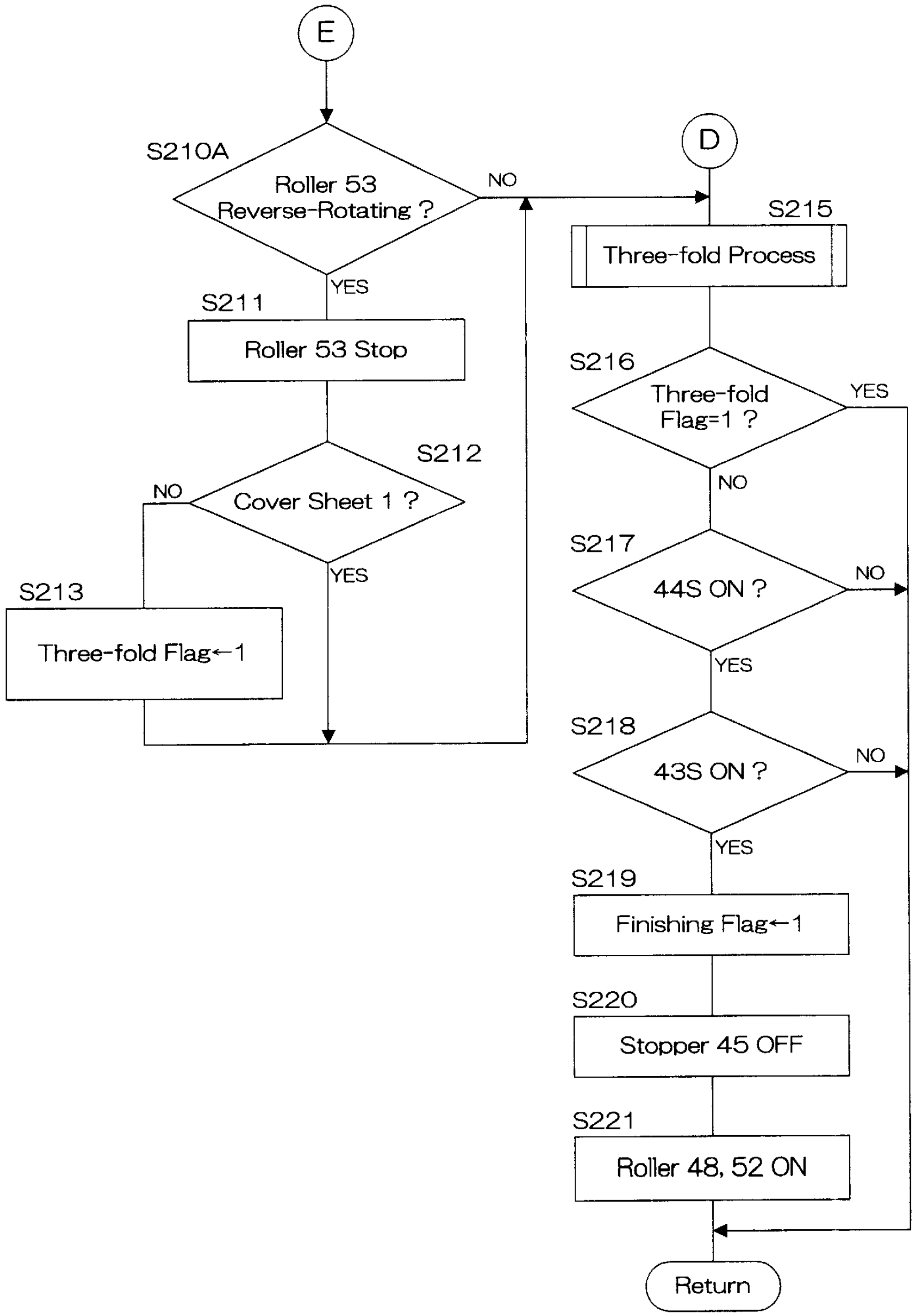
Figure 17:
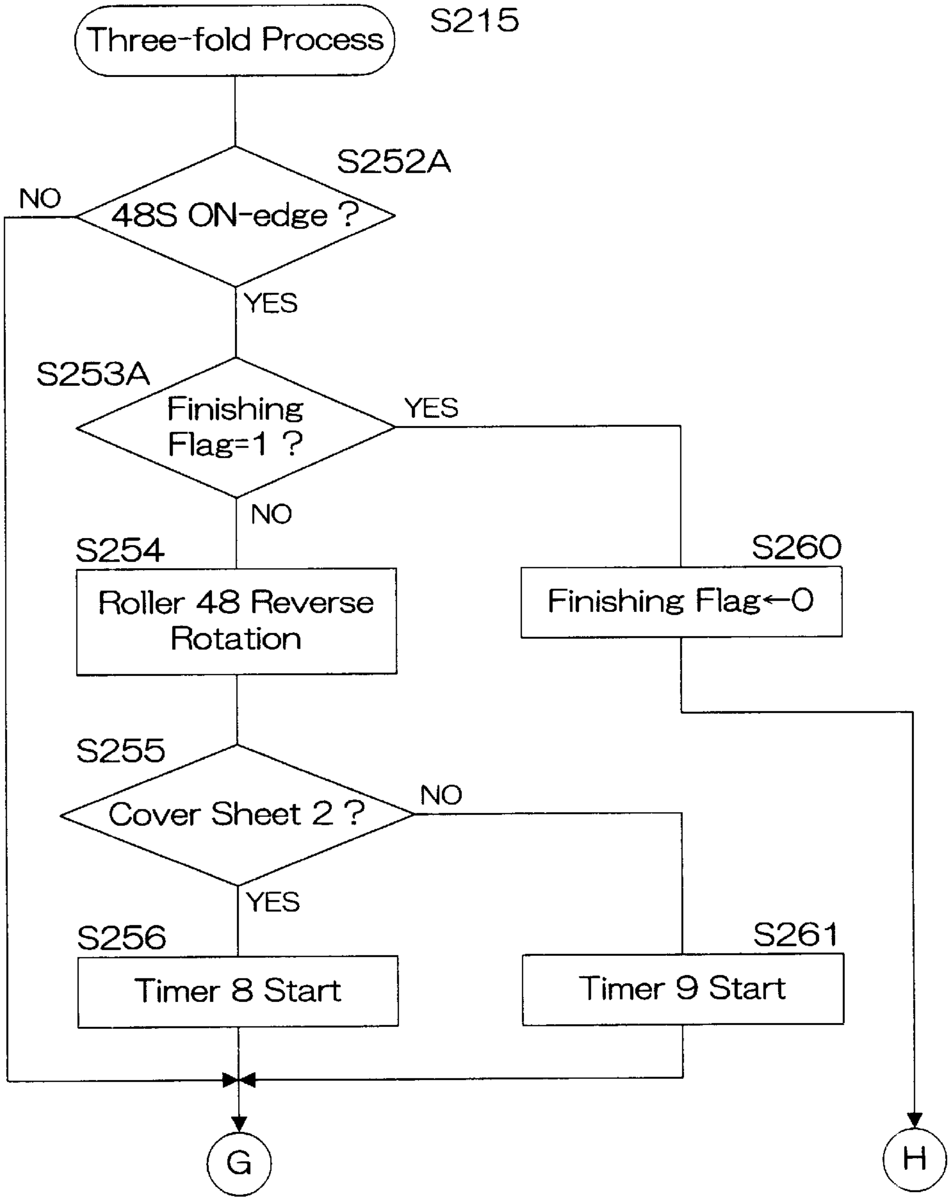
FIGS. 17 and 18 are flow charts showing part of the three fold process in FIG. 16.
Figure 18:
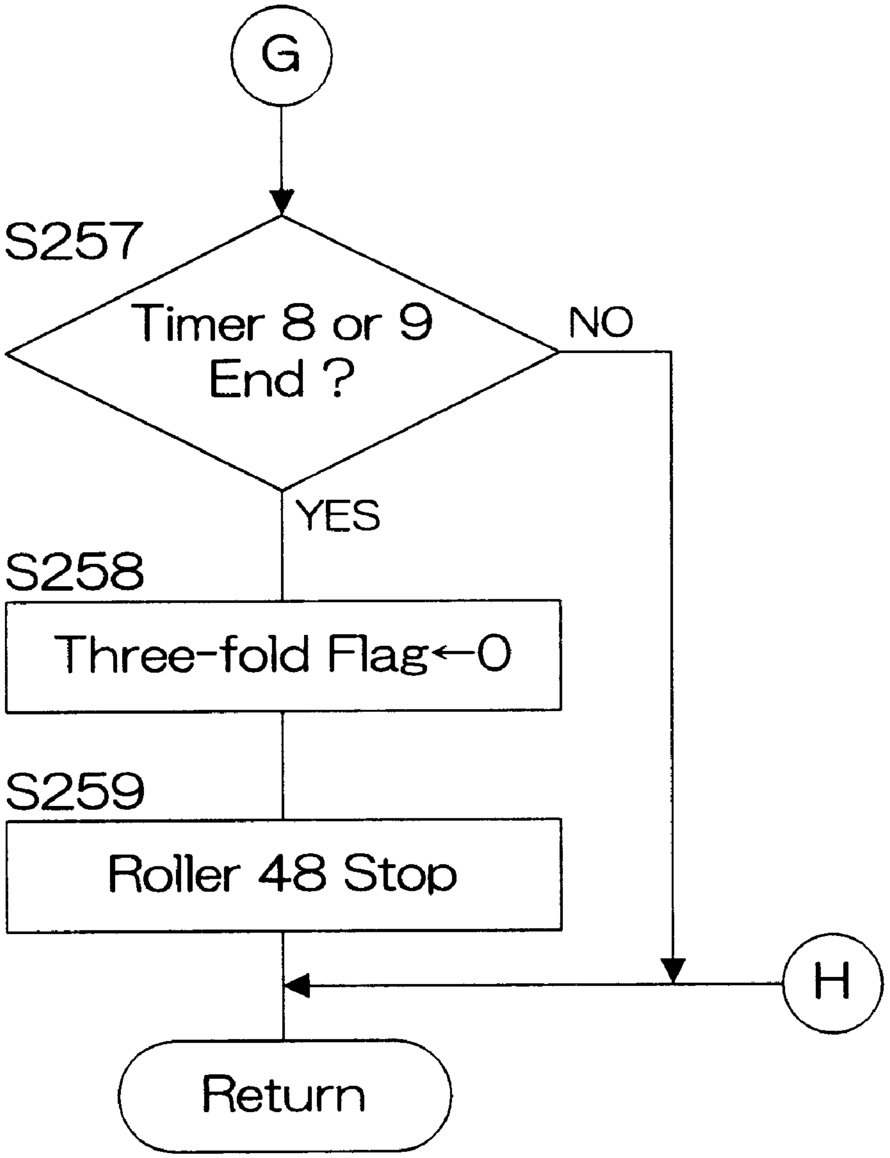
Figure 19A:
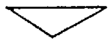
Figure 19A:
Figure 19A:
Figure 19A:
Figure 19A:
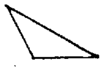
Figure 19A:
Figure 19B:
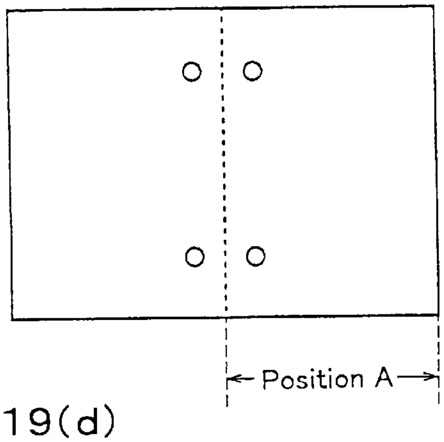
Figure 19C:
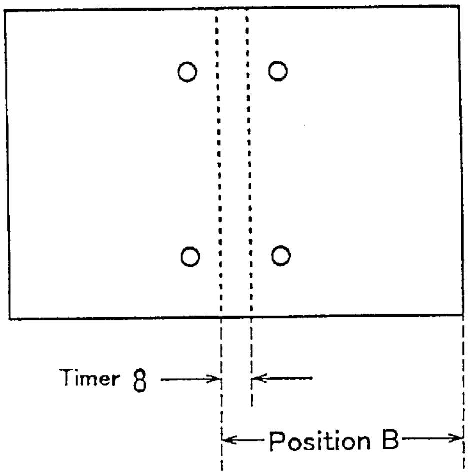
Figure 19D:
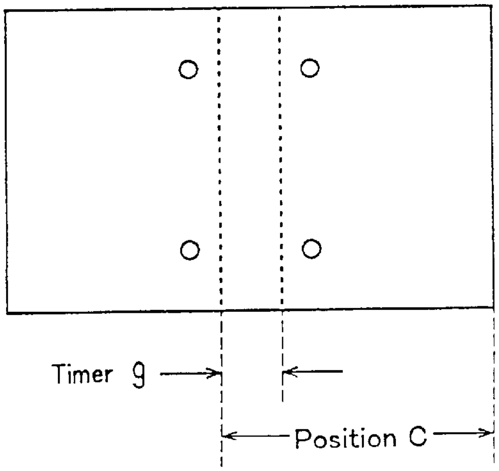
Figure 20A:
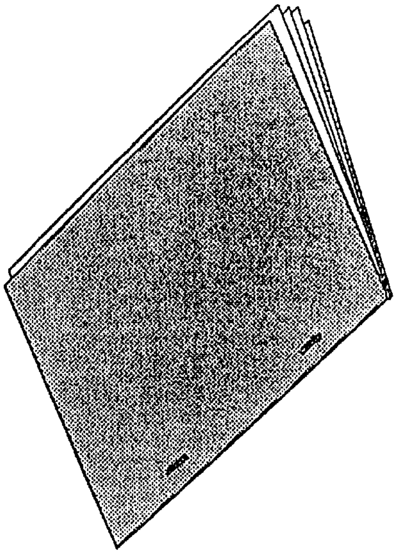
Figure 20B:
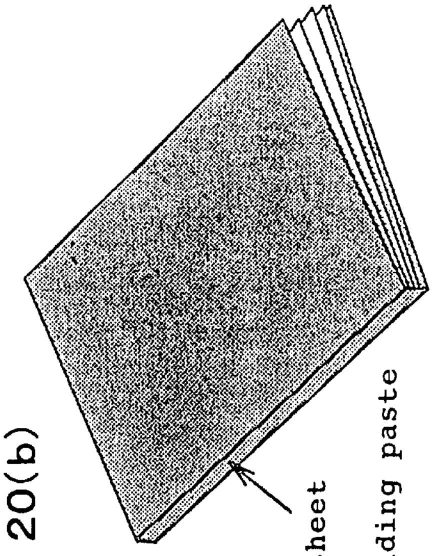
Figure 21A:
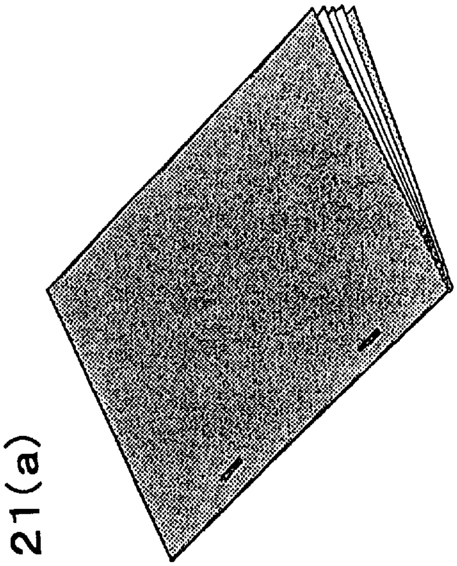
Figure 21B:
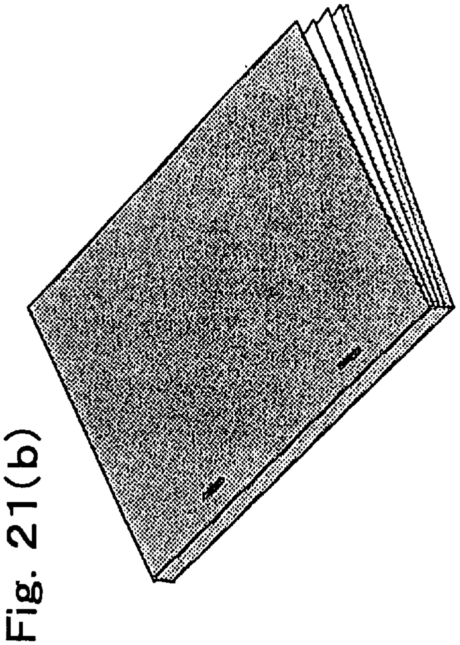
Figure 21C:
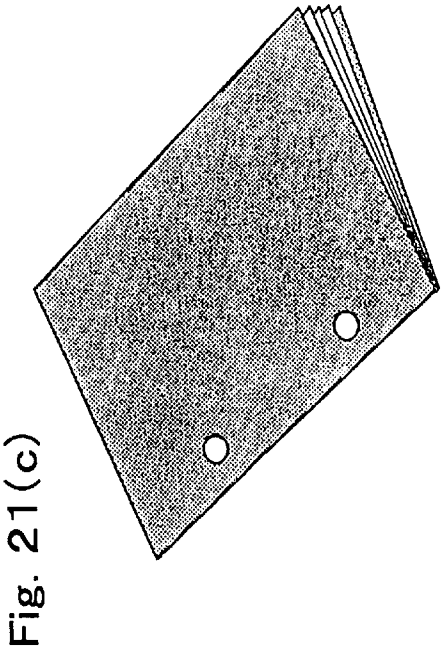
Figure 21D:
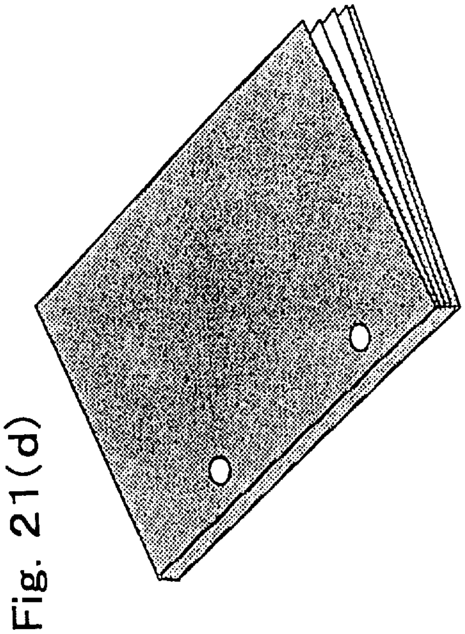
Figure 22A:
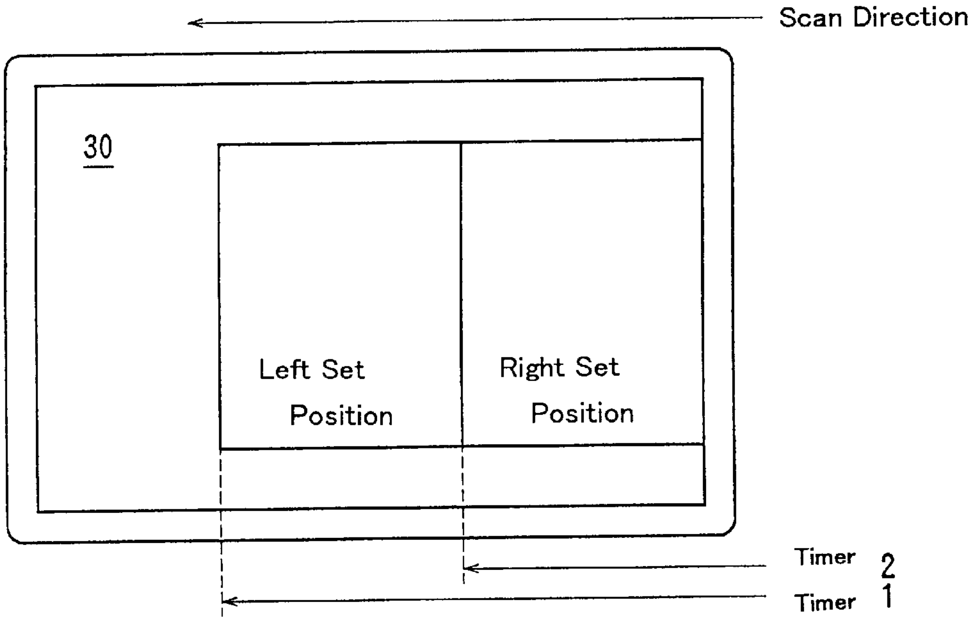
Figure 22B:
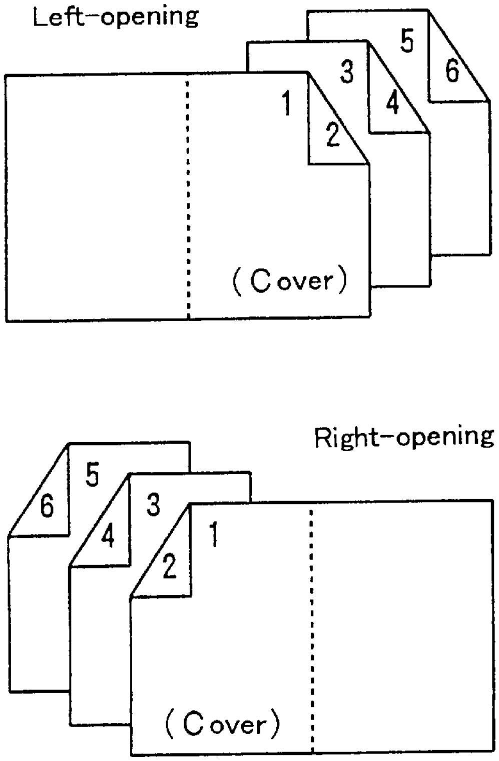
Figure 23A:
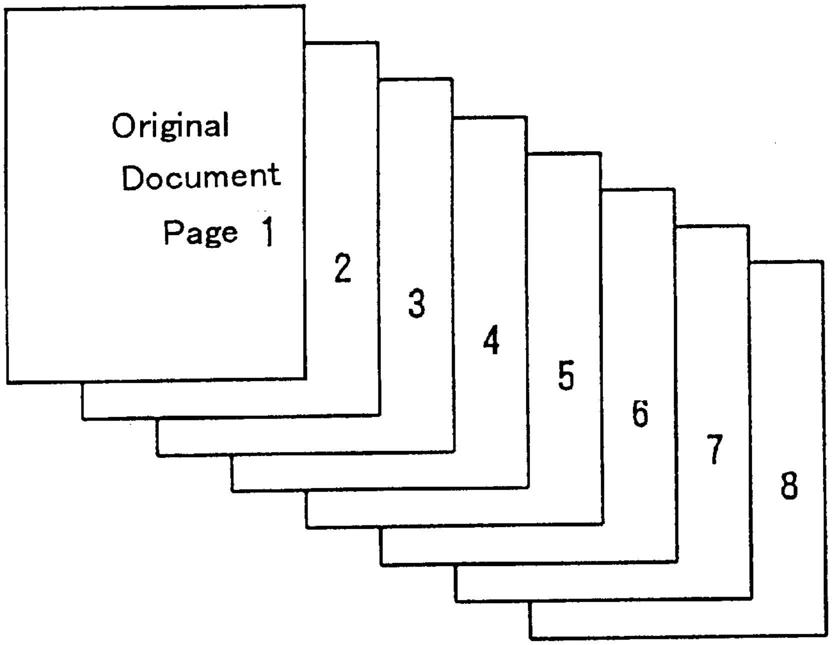
Figure 23B:
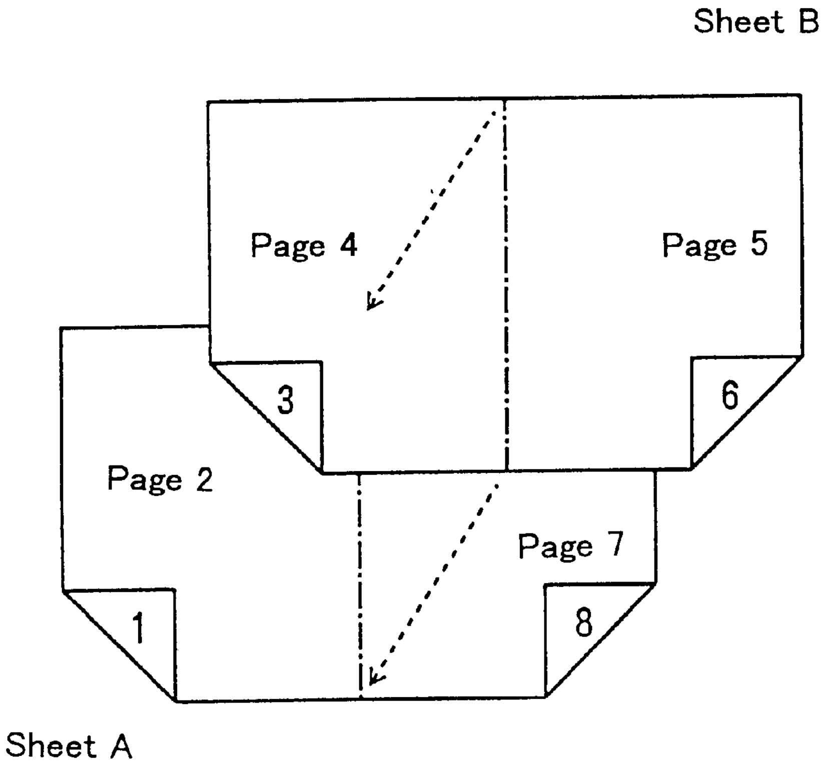
Figure 24:
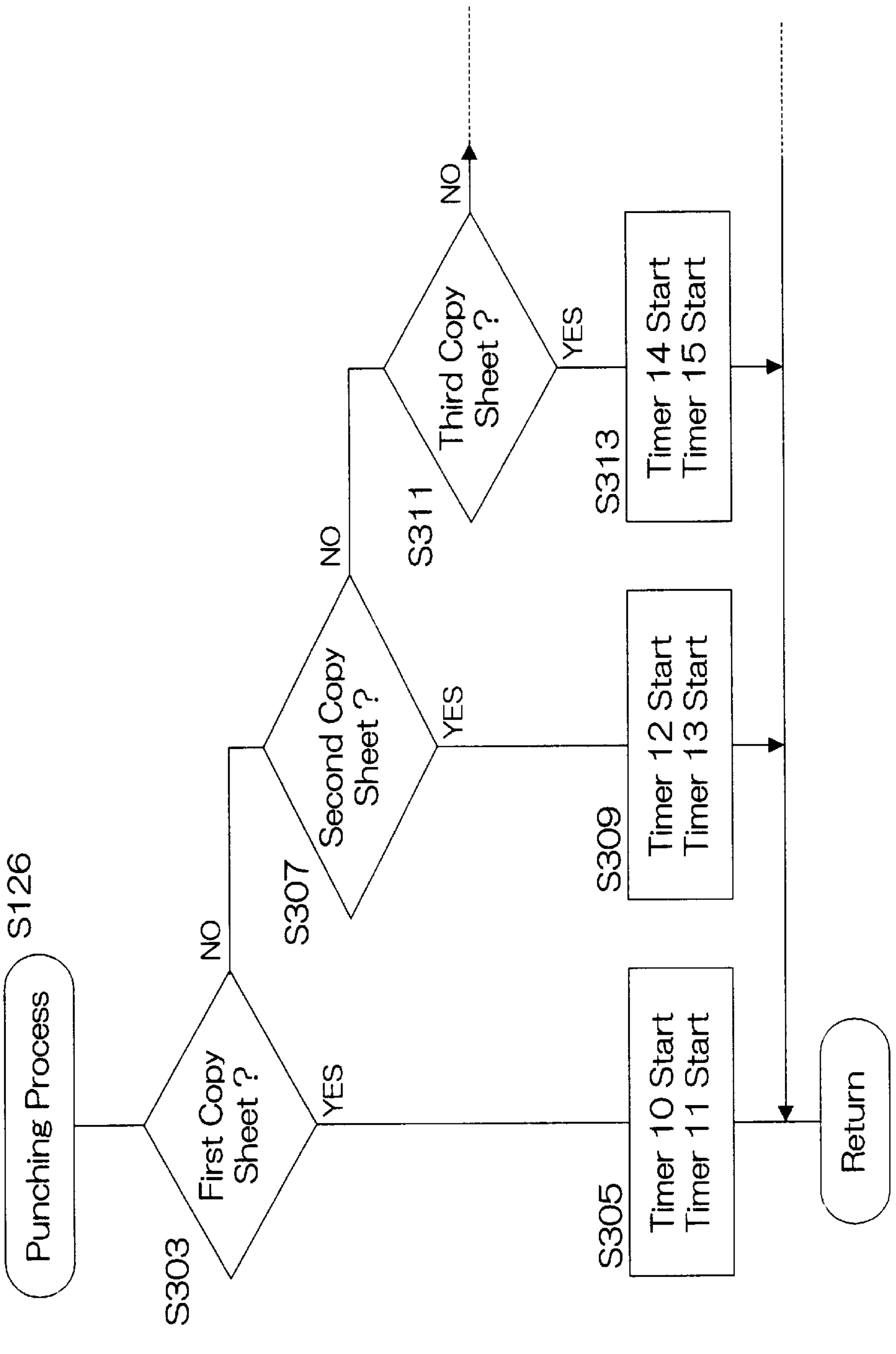
Figure 25A:
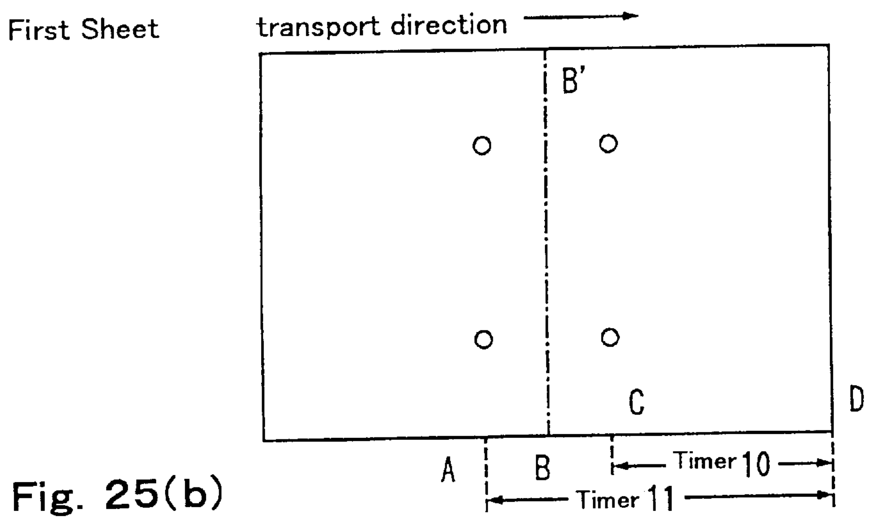
Figure 25B:
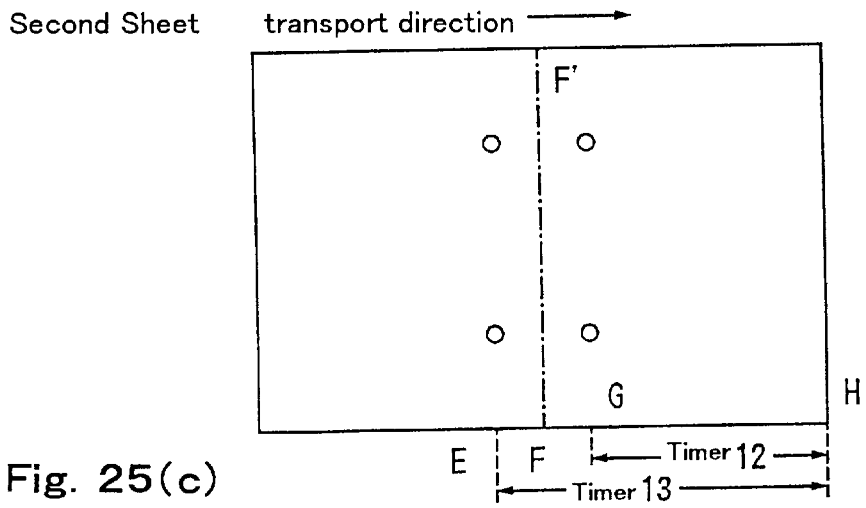
Figure 25C:
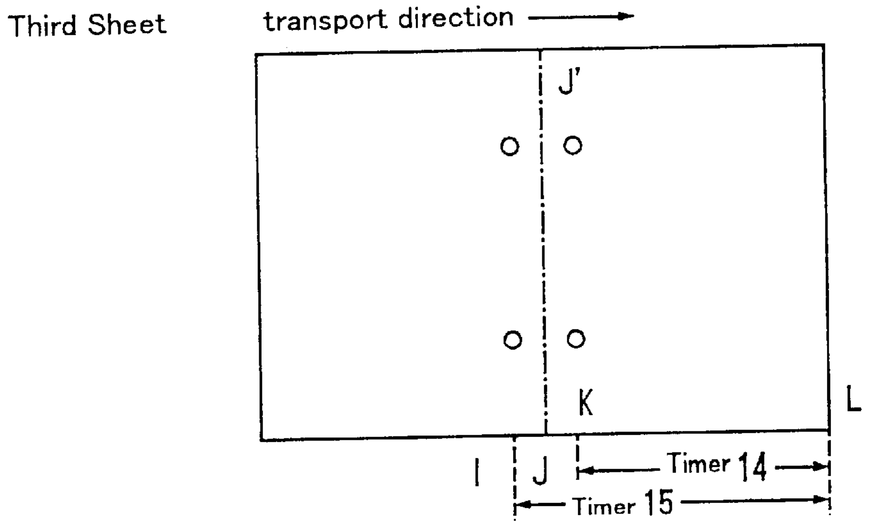
Figure 26A:
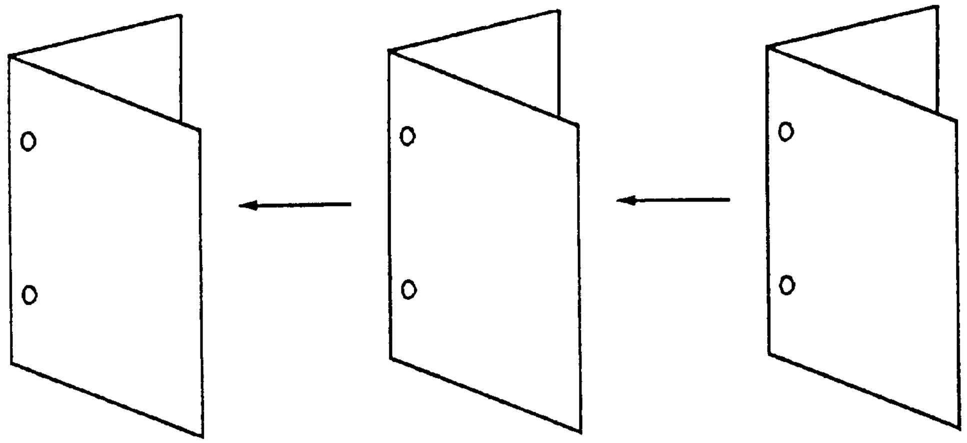
Figure 26B:
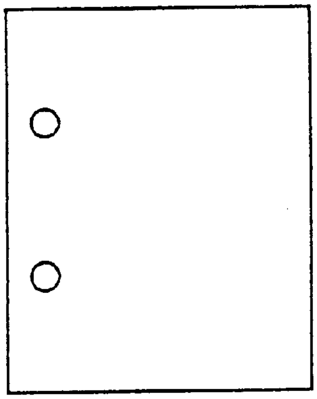
Figure 26C:
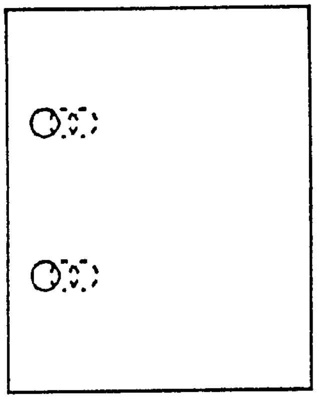

FIG. is a flow chart showing the three fold process in FIG. 16;

FIG. 19(*a*) illustrates the A, B, and C positions of switching elements 41 and 42, and FIGS. 19(*b*),19(*c*) and 19(*d*) shows the A, B, and C positions of stopper 56;

FIGS. 20(*a*) and 20(*b*) show examples of conventional binding methods;

FIGS. 21(*a*), 21(*b*), 21(*c*), and 21(*d*) show examples of the binding methods of the present invention;

FIG. 22(*a*) illustrates the document right set position and left set position, and FIG. 22(*b*) illustrates the left-opening mode and right-opening view mode of the recording sheets and cover sheets;

FIGS. 23(*a*) and 23(*b*) show the stacking method of the recording sheets and the recording position of each image when document images are copied to recording sheets and said recording sheets are bound in magazine style;

FIG. 24 is a flow chart showing the hole punching process of FIG. 11;

FIGS. 25(*a*), 25(*b*), and 25(*c*) illustrate the relationship between timing and hole positions in the magazine mode; and FIGS. 26(*a*), 26(*b*), and 26(*c*) show the dislocation of the punched hole position when magazine binding is used, and the compensation for same.

DESCRIPTION OF THE PREFERRED EMBODIMENTS

The preferred embodiments of the present invention are described hereinafter.

(1) Construction of the Copying Apparatus

First, the construction of the copying apparatus is described below with reference to FIGS. 1~4.

This copying apparatus comprises a re-circulating document handler (RDH) disposed on copier body 20, and a finisher 40 disposed on the sheet discharge side of copier body 20.

Figure 1:
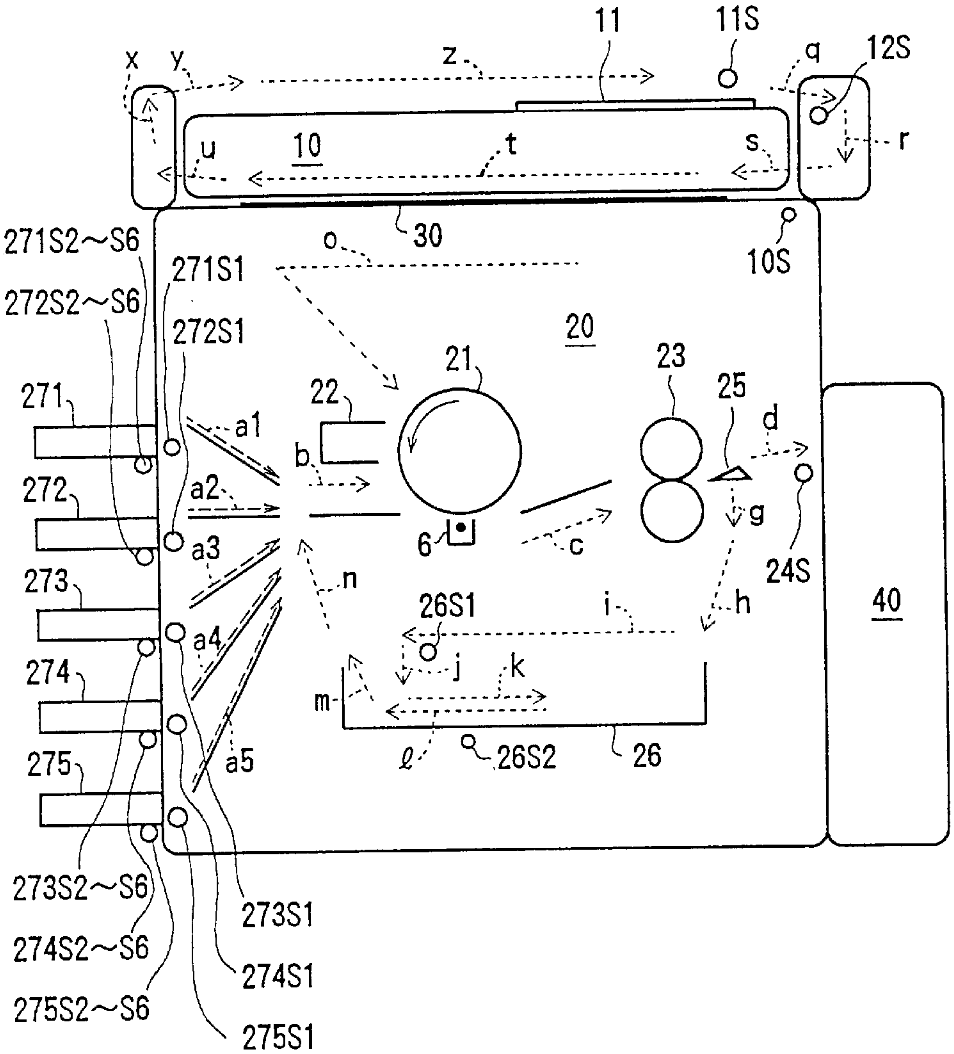
FIG. 1 shows the internal mechanisms of a copying apparatus of the present embodiment.

(a) RDH 10 (FIG. 1)

RDH 10 executes document auto feeding and counting. That is, documents set with the document surface facing upward in document tray 11 are fed therefrom sequentially from the lowermost document in response to control signals from CPU 61 (FIG. 4) in the copier body, and the fed document is transported onto document table 30 of copier body 20 via a feed path indicated by the dashed arrow q-->r-->s, and set in a predetermined position. In this state, the document image is scanned by an optical unit, and thereafter the document is ejected via the feed path indicated by dashed arrow t-->u-->x-->y, and is returned to document tray 11 via a feed path indicated by dashed arrow z. RDH 10 is capable of scanning an image while a document is being transported (i.e., panning).

Figure 4:
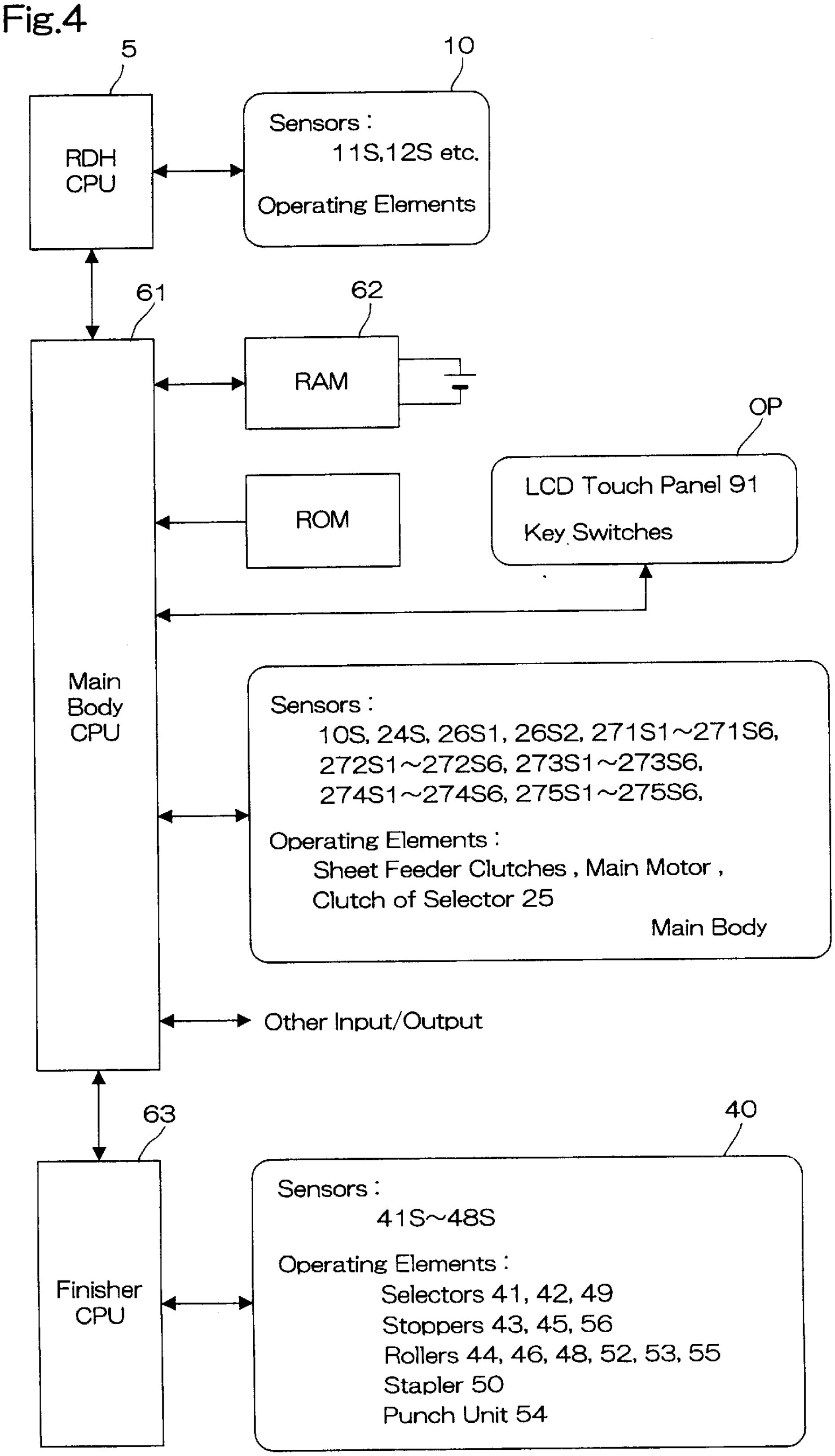
FIG. 4 is a block diagram showing the construction of the control circuit in the copying apparatus of the present embodiment.

The setting of a document on document tray 11 is detected by document sensor 11S, and after said information is transmitted to CPU 5 of RDH 10, it is transmitted to CPU 61 of the copier (refer to FIG. 4). The document fed from document tray 11 for image scanning is detected by document sensor 12S, and after said information is input to CPU 45 on the RDH side, said information is transmitted to CPU 61 of the copier body in the same manner as for document sensor 11S. In this way the number of fed documents is counted. Furthermore, the connection between RDH 10 and copier body 20 can be detected by, for example, RDH sensor 10S.

(b) Copier Body 20 (FIG. 1)

Copier body 20 executes the copying process according to the electrophotographic method. That is, a document placed at a predetermined scanning position on document table 30 is scanned by a scanning optical unit not shown in the drawing, and the light reflected from said document is directed via the path indicated by the dashed arrow o to the surface of photosensitive drum 21 which is uniformly charged and rotating at constant speed, so as to form an electrostatic latent image on the surface of said photosensitive drum 21, which is subsequently developed as a toner image via developing device 22, and transferred onto a recording sheet fed with a predetermined timing, and said toner image is then fixed to said recording sheet. Although the copier shown in FIG. 1 is of the analog type, the present invention is naturally suitable for application to a digital type copier (e.g., an apparatus which reads a document image to generate image data, compresses said image data and stores said compressed data in an image memory, expands the data read from said image memory, and drives a printhead such as a scanning laser optical unit, LED array or the like based on said image data so as to form an electrostatic latent image on the charged surface of photosensitive drum 21). In the case of a copier of the digital type, a read image can be pre-stored in memory, such that a document feeding device of the non-circulating type may be used instead of the RDH 10 of the re-circulating type.

When the first paper supply port is selected as the paper supply port, a sheet is transported from first cassette 271 to the transfer unit (i.e., the transfer position between photosensitive drum 21 and transfer charger 6) via the path indicated by the dashed line of arrow a1→b, and the transfer process is executed. Similarly, when the second paper supply port is selected as the paper supply port, a sheet is transported from second cassette 272 to the transfer unit via the path indicated by the dashed line of arrow a2→b, and the transfer process is executed. Likewise, when the third paper supply port is selected as the paper supply port, a sheet is transported from third cassette 273 to the transfer unit via the path indicated by the dashed line of arrow a3→b, and the transfer process is executed. In the same way, when the fourth paper supply port is selected as the paper supply port, a sheet is transported from fourth cassette 274 to the transfer unit via the path indicated by the dashed line of arrow a4→b, and the transfer process is executed. Similarly, when the fifth paper supply port is selected as the paper supply port, a sheet is transported from fifth cassette 275 to the transfer unit via the path indicated by the dashed line of arrow a5→b, and the transfer process is executed.

Each of the aforesaid cassettes 271~275 is respectively provided with a sensor 271S, 272S, 273S, 274S, 275S to detect the presence/absence of recording sheets in said cassette, and is further provided with sensor groups 271S2~271S6, 272S2~272S6, 273S2~273S6, 274S2~274S6, and 275S2~275S6, respectively, to detect the type and size of the copy sheet accommodated in the respective cassette, and the detection signals output from each sensor are transmitted to CPU 61 of the copier body (refer to FIG. 4). Codes are generates which correspond to the size and type (i.e., cover recording sheet 1, cover recording sheet 2, cover recording sheet 3, and non-cover recording sheet) of recording sheet accommodated in each cassette based on the signals output from said sensor groups 271S2~271S6, 272S2~272S6, 273S2~273S6, 274S2~274S6, and 275S2~275S6.

The non-cover recording sheet is plain printing paper used for printing documents other than cover sheets (i.e., internal documents).

The recording sheet used in the previously described transfer process is then transported to fixing device 23 via the path indicated by the dashed arrow c, and subjected to a fixing process. Thereafter, the recording sheet is transported to finisher 40, or intermediate tray 26 for duplex copies in accordance with the set position of switching member 25.

That is, when switching member 25 is set at the position in the illustration, the recording sheet is guided by the top surface of said switching member 25 to finisher 40 disposed outside the apparatus via the path indicated by the dashed arrow d. This passage of the recording sheet is detected by sensor 24S. Processing of the recording sheet within finisher 40 is described later.

When switching member 25 is set at a position rotated somewhat from the position in the illustration, i.e., when set at the position at which the leading edge of the recording sheet transported from fixing device 23 contacts the bottom surface of switching member 25, the switching member 25 guides the recording sheet through the path indicated by the dashed arrow g→h→i→j→k to intermediate tray 26 so that the recording sheet is accommodated therein with the recorded surface facing upward.

Intermediate tray 26 is provided for the copying process of a second side (back side) of a copy sheet and temporarily accommodates a recording sheet which has received a copy image on a first side (front side) when the so-called duplex copy mode has been selected to record copy images on both sides of a single recording sheet.

That is, when copying to the second side of recording sheet in the duplex copy mode, the recording sheet in the intermediate tray 26 is transported via the path indicated by the dashed arrow l→m→n→b to execute the copy process on the second side of the recording sheet. A sensor 26S1 is provided in intermediate tray 26 to detect the recording sheet arriving in intermediate tray 26, and sensor 26S1 is provided in intermediate tray 26 to detect the presence/absence of recording sheets within intermediate tray 26.

Figure 2:
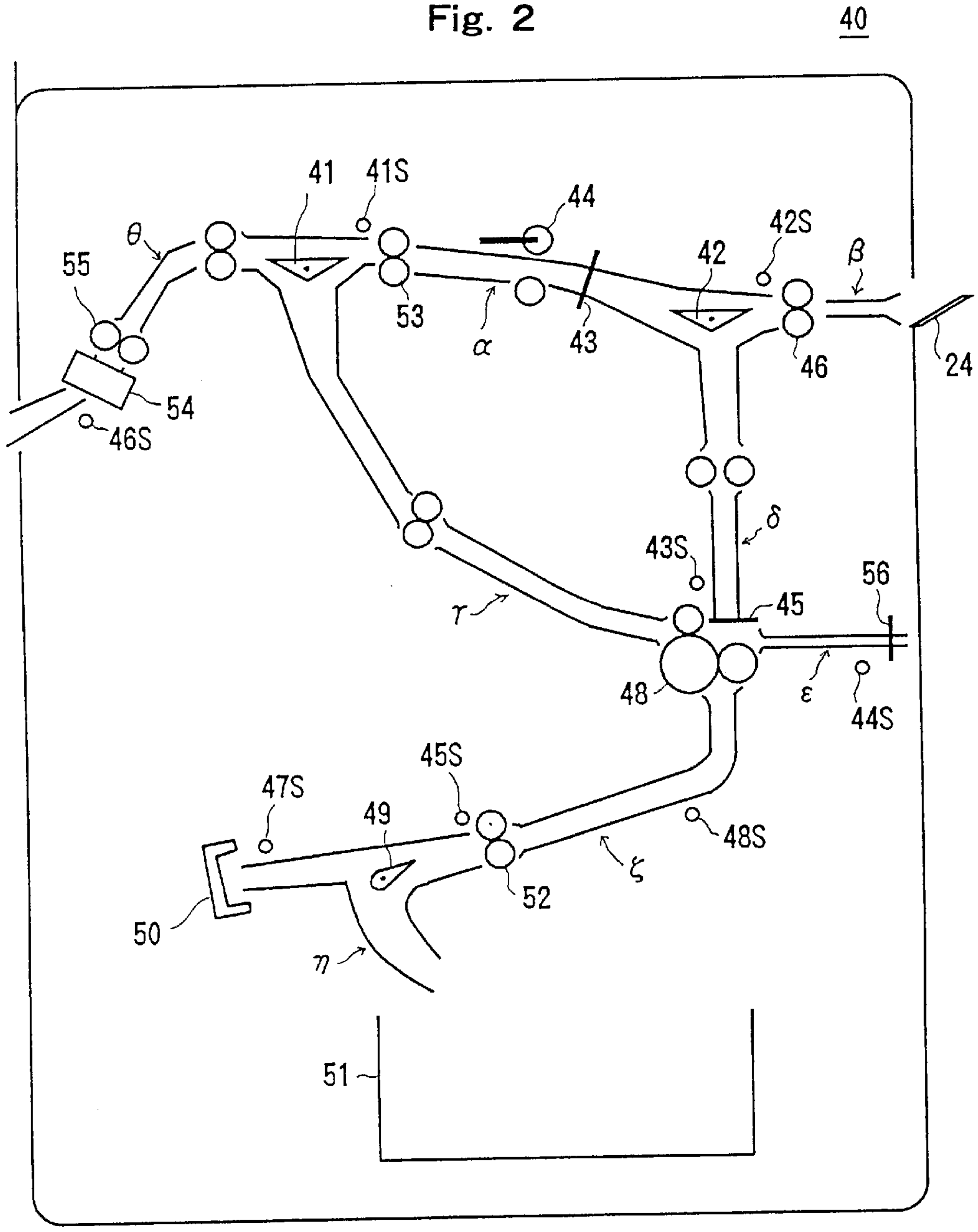
FIG. 2 shows the internal mechanisms of finisher 40 of the copying apparatus of the present embodiment.

(c) Finisher 40 (FIG. 2)

Finisher 40 is capable of binding recording sheets arriving from the copier 20 side via punch holes at common positions on said recording sheets, or binding via staples, and accommodating the bound sheets in tray 51. In the cover mode, the finisher 40 inserts non-cover recording sheets between a cover recording sheet having either two or three folds.

Finisher 40 is provided with paper paths θ, α, β, γ, δ, ϵ, ζ, and η, and said paper paths α, β, γ, δ, ϵ, ζ, and η disposed downstream from switching member 41 are selected in accordance with the set mode. The selection of the paper paths is accomplished by suitably selecting the set position of switching members 41, 42, and 49, and suitably switching rollers 44, 46, 48, 52, and 53 ON/OFF to feed the recording sheet.

Finisher 40 also accumulates recording sheets (non-cover recording sheets) within paper paths α and β by suitably switching stoppers 43 and 45 ON/OFF. Furthermore, finisher 40 is provided with a function to select either two or three folds for a cover recording sheet, and adjust the width of the three folds by suitably switching the set position of stopper 56.

In the non-staple mode (discharge mode), paper paths α and β are selected such that the recording sheet passes through the paper paths α→β, and is ejected to discharge tray 24 outside the apparatus.

In the staple mode, paper paths α, δ, ζ are sequentially selected, such that a single set of recording sheets is transported to stapler 50 and subjected to a stapling process. After the stapling process, the recording sheets are guided by the bottom surface of switching member 49 after the set position is changed, and the recording sheets enter paper path η, and pass through said paper path η and are deposited in tray 51.

In the punch mode, punching unit 54 is operated with a predetermined operation timing, so as to punch holes in said recording sheets such that said holes are at common positions when the sheets are stacked. In the punch mode, when a cover mode is set, the non-cover recording sheets are subjected to hole punching at common positions as described above. Cover sheet recording sheets are subjected to hole punching with an operation timing for cover sheet (or back cover sheet) hole punching in addition to the operation timing for punching holes at common positions.

In magazine mode, punch unit 54 is operated with two operation timings stipulated by timers which sequentially adjusts the value for each recording sheet (or each group of a predetermined number of recording sheets). In this way, holes are punched symmetrically so as to circumscribe the fold line (dash-dot line in the drawing) at the center position in the sheet transport direction, as shown in FIGS. 25(*a*)~25(*c*). The position of the punched hole in each recording sheet is adjusted to positions which compensate for position shifting as shown in FIG. 26(*b*), when a plurality of pages overlap when folded in magazine style as shown in FIG. 26(*a*). Therefore, the punched holes in the recording sheets do not shift position due to the thickness of the overlapping recording sheets as shown in FIG. 26(*c*).

In the right-opening cover mode, the non-cover sheet recording sheets are collected in a single set by selecting paper paths α and δ such that the set is transported to stopper 45; the cover sheet recording sheet is transported to a position directly below stopper 45 after the cover sheet is inverted front-to-back by selecting paper paths α, γ, ϵ. The right-opening cover mode is a mode in which non-cover recording sheets are accommodated between a folded cover recording sheet twice as large as said non-cover recording sheets, such that the cover recording sheet is opened to the right for viewing, as shown in FIG. 22(*b*).

In the left-opening cover mode, the non-cover sheet recording sheets are collected in a single set by selecting paper paths α, β, and δ such that the set is inverted front-to-back and transported to stopper 45; the cover sheet recording sheet is transported to a position directly below stopper 45 after the cover sheet is inverted front-to-back by selecting paper paths α, γ, ϵ. The left-opening cover mode is a mode in which non-cover recording sheets are accommodated between a folded cover recording sheet twice as large as said non-cover recording sheets, such that the cover recording sheet is opened to the left for viewing, as shown in FIG. 22(*b*).

In the folding processes executed in the right-opening cover mode and left-opening cover mode, the cover sheet recording sheet positioned within the paper paths γ and ϵ is gripped between rollers 48 with the fold area as the top as shown in the bottom frame of FIG. 12, and then is pulled into paper path ζ to impart the fold. The fold is imparted at this time by the recording sheet set held in paper path δ, which is dropped onto the cover sheet recording sheet positioned in paper paths γ and ϵ.

To realize the aforesaid functions, finisher 40 is provided with a sensor 46S to detect a recording sheet fed from the copier body 20 in front of hole punch unit 54, sensor 41S to detect the recording sheet near the entrance to paper path α, sensor 42S to detect the recording sheet near the entrance to paper path β, sensor 43S to detect the recording sheet near the exit of paper path δ, sensor 44S to detect the recording sheet near the end of paper path ε, sensor 45S to detect the recording sheet near the entrance to paper path ζ (near the tip of switching member 49), and sensor 47S to detect the recording sheet in front of stapler 50, such that detection signals from said sensors are transmitted through the control CPU 63 of the finisher to the controls CPU 61 of the copying apparatus (refer to FIG. 4).

In the device in the illustration, when a plurality of copies is specified, a single copy of each document is made first, and when one set of documents has been consecutively copied, the document are fed again to make a second copy, such that complete sets of copies are made sequentially. In the case of a digital copier provided with a document feeder of the non-circulating type, the document image reading operation is executed in one set, and subsequent copy operations are executed based on image data stored in memory.

Figure 3:
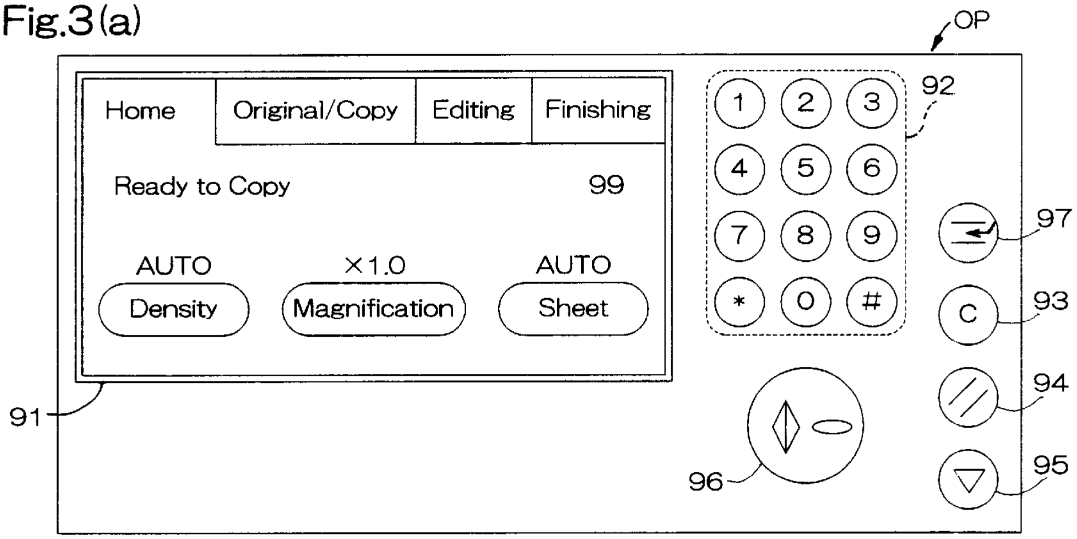
FIG. 3(*a*) illustrates the operation panel of the copying apparatus of the present embodiment, FIGS. 3(*b*) and 3(*c*) show examples of the displays of liquid crystal touch panel 91 in the operation panel of the present embodiment.
Figure 3:
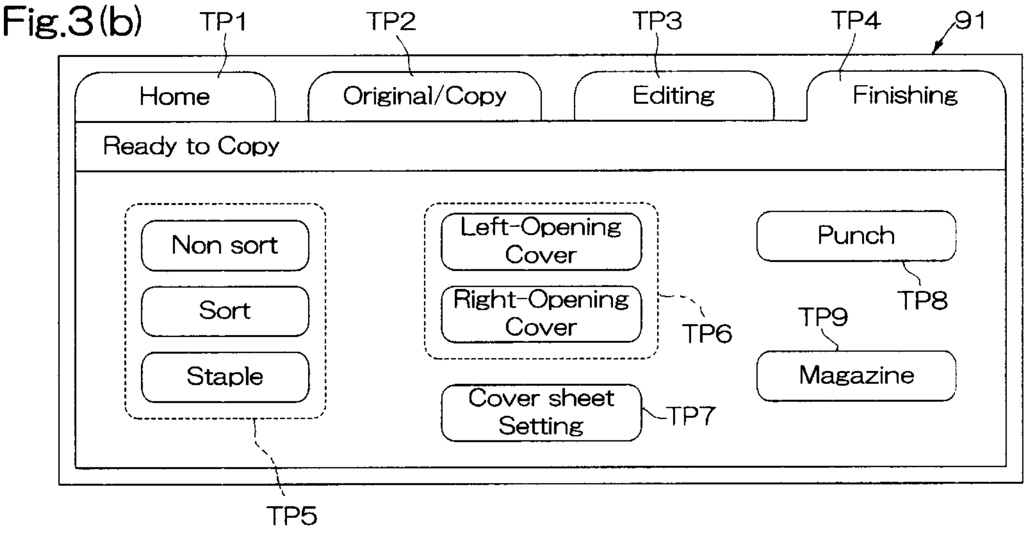
Figure 3:
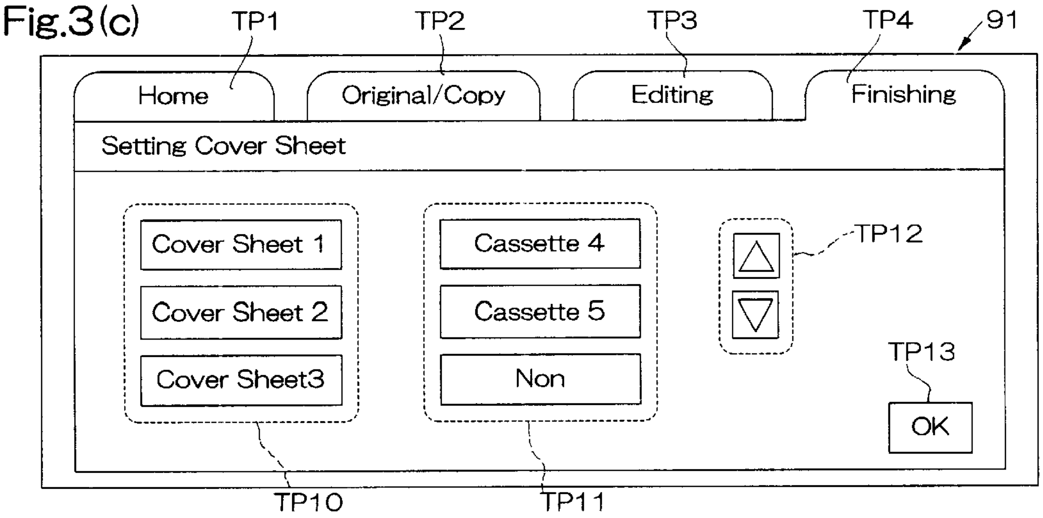

(d) Operation Panel (FIGS. 3(*a*)~3(*c*)

The operation panel OP is provided with a ten-key pad 92 for entering the number of copies and copy magnification and the like, clear key 93 for returning the aforesaid numeric values to a default value [1], panel reset key 94 for returning set value within the copier to default values, stop key 95 for stopping an executing copy operation, start key 96 for starting a copy operation, and interrupt key 97 for interrupting an on-going copy operation to execute another operation.

Liquid crystal touch panel 91 displays density level, copy magnification, recording sheet size, copy mode such as type of finish and the like, as well as information about various abnormal conditions such as paper jam, service call, out-of-paper condition and the like and other information, and further allows input to specify the operation mode.

FIG. 3(*a*) shows the basic screen display; this screen is displayed as the standard screen display and when the home key TP1 is pressed. The screens for setting the corresponding modes are displayed when the document/copy key TP2 and edit key TP3 are pressed.

FIG. 3(*b*) shows the display directly finishing key TP4 has been pressed on liquid crystal touch panel 91. Touch panel key group TP5 is used to select an optional finish mode from among the non-sort, sort, staple/sort modes as the finish mode. Touch panel key group TP6 is used to select either the left-opening mode or right-opening mode as the binding mode. Touch panel key TP7 is used to advance the cover sheet setting screen. Touch panel key TP8 is used to set the punch mode. Touch panel key TP9 is used to set the magazine mode.

FIG. 3(*c*) shows the display directly after touch panel key TP7 is pressed to advance the cover sheet setting screen; this screen is used to set the cover sheet from among the paper cassettes 271~275.

Touch panel key group TP10 is used to select the type of cover sheet. The touch panel key of the type of cover sheet desired can be selected by pressing UP/DOWN key TP12 to change the set cassette to the type of cover sheet desired to correspond to the display in display TP11. In the present example, the types of cover sheets include cover sheet 1 (cover sheet recording sheet 1) which has a length in the sheet transport direction which is twice (2×) the size of the non-cover recording sheets, cover sheet 2 (cover sheet recording sheet 2) which has a length 2x+7 mm, and cover sheet 3 (cover sheet recording sheet 3) which has a length 2x+14 mm; although the length of these sheets in the sheet transport direction differ in the present example, the present invention is not limited to this arrangement. In FIG. 3(*c*), cover sheet recording sheet 1 is accommodated in the fourth cassette, and cover sheet recording sheet 2 is accommodated in the fifth cassette.

An operation entered from the aforesaid various key switches and touch panel are transmitted to CPU 61 of the copier body. The aforesaid various displays are controlled by the CPU 61 of the copier body. The setting conditions of the various modes described above are stored in RAM 62 which is provided with a backup battery. The main unit CPU 61 controls the clutches and the like of switching member 25, various operation units within copier body 20, as well as the various operation units of finisher 40 via CPU 623 of finisher 40.

2. Processes Executed by CPU 61

The operation of the copying apparatus is described hereinafter with reference to FIGS. 12, 19, and 22 and the flow charts (FIGS. 5~11, FIGS. 13~18) which describe the processes executed by CPU 61. In the following description, the term "ON-edge" is defined as the change of state of a signal from OFF to ON, and the term "OFF-edge" is defined as the change of state of a signal from ON to OFF.

Figure 5:
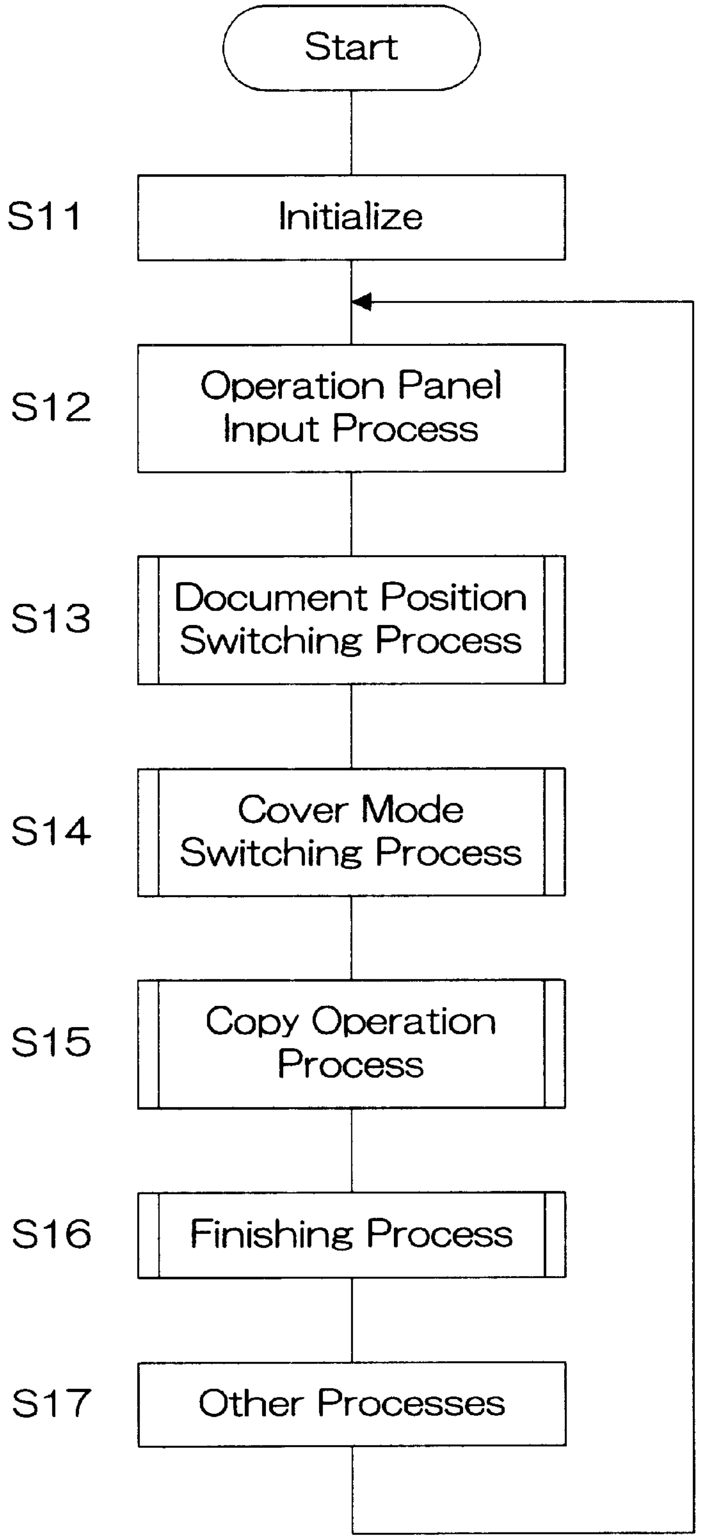
FIG. 5 is a main flow chart showing the processing by central processing unit (CPU) 61 of FIG. 4.

(a) Main Routine (FIG. 5)

In CPU 61, when, for example, processing starts by connection to a power source, RAM 62 is cleared and initialization is executed (S11). Thereafter, the loop processes of steps S12~S17 are repeated.

In the operation panel input process (S12), processing is executed which corresponds to the input operation from operation panel OP shown in FIG. 3.

In the document position switching process (S13), processing is executed to switch the document set position on the document table 30 to correspond to the selected mode. Details of this process are described layer with reference to FIGS. 6 and 22.

In the cover mode switching process (S14), processing is executed to select the type of cover sheet in accordance with the number of documents. Details of this process are described later with reference to FIGS. 7 and 8.

In the copy process (S15), processing is executed to realize the copy operation sequence when predetermined conditions have been satisfied. Details of this process are described later with reference to FIG. 9.

In the finishing process (S16), the punch process for punching holes in the recording sheets, the cover mode process for inserting non-cover sheet recording sheets between cover sheets, and the staple process for stapling a set of recording sheets are executed either selectively or in combination in accordance with the selected mode. Details of this process are described later with reference to FIGS. 8~19.

Other processes (S17) are executed by CPU 61, such as processes other than the aforesaid processes to bind and stable recording sheets.

The document position switching process (S13), cover sheet mode switching process (S14), copy process (S15), and finishing process (S16 are described sequentially below.

Figure 6:
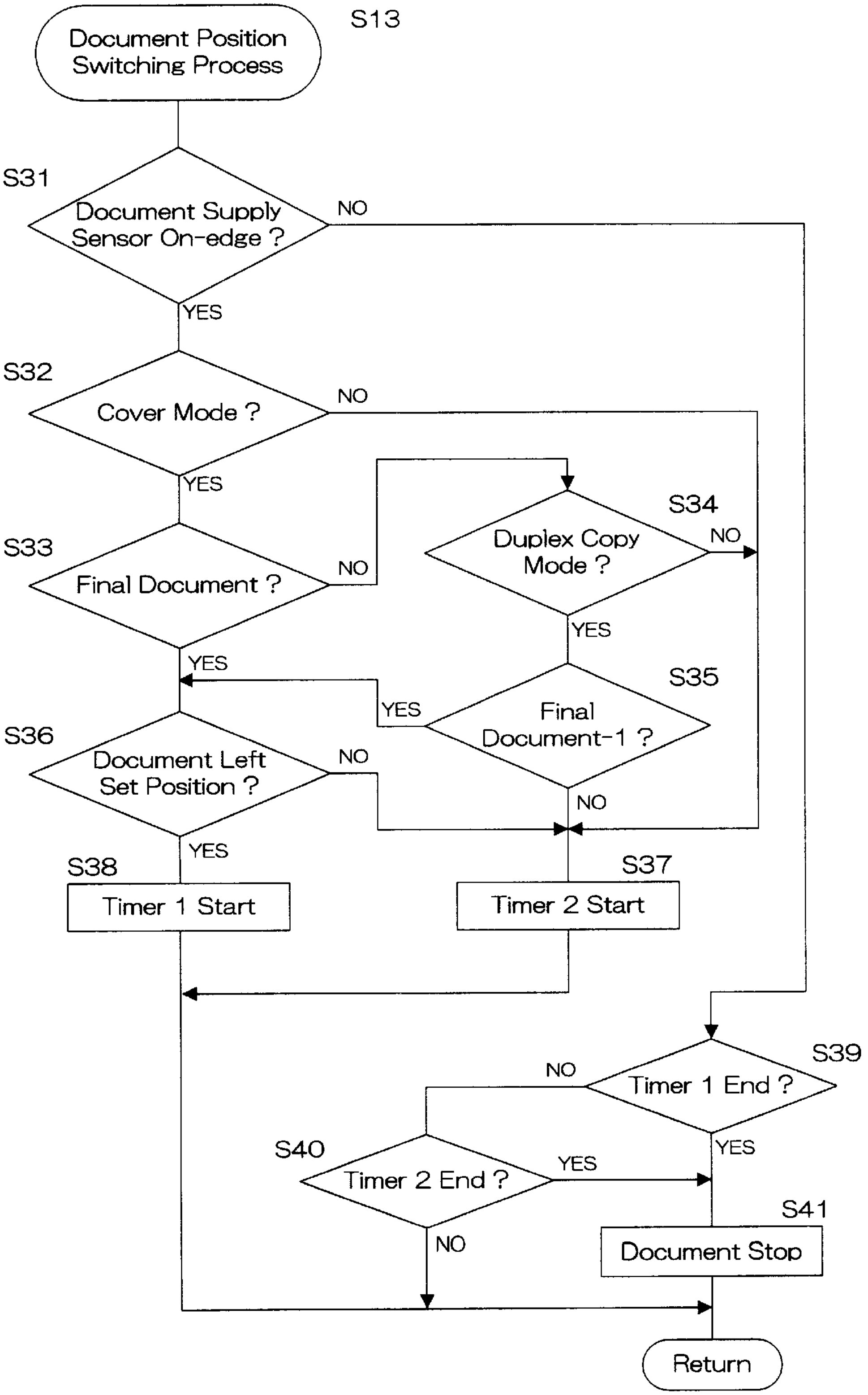
FIG. 6 is a flow chart showing the document position switching process of FIG. 5.

(b) Document Position Switching Process (FIGS. 6 and 22(*a*),22(*b*))

When the detection signal of document sensor 12S is ON-edge (S31: YES), either timer 1 and timer 2 which manage the continuous time of the document transport operation is started in accordance with whether or not an image is being formed on a cover sheet recording sheet or an,image is being formed on a non-cover sheet recording sheet. Timer 1 times the transport time required to move the leading edge of a document from the position of document sensor 12S to left edge set position (FIG. 22(*a*)). Timer 2 times the transport time required to move a document to the right edge set position.

When document sensor 12S is ON-edge (S31: YES) and a cover sheet mode has not been set (S32: NO), timer 2 is started to transport the document to the normal set position (right set position) and stop (S37).

Even when document sensor S12 is ON-edge and the cover sheet mode has been set (S32: YES), but the image is formed on normal plain paper and not a cover sheet recording sheet, i.e., when it is not the final document (S33: NO) and not the duplex copy mode (S34: NO), and when it is the duplex copy mode (S34: YES) but is not the document directly prior to the final document (S35: NO), timer 2 is started to transport the document to the normal set position (right set position) and stop (S37).

Timer 1 is started (S38) when the document sensor 12S is ON-edge and the cover sheet mode has been set (S32: YES) and an image is being formed on the cover sheet recording sheet at a position corresponding to the right set position shown in FIG. 22(*a*), or and said document is the final document (S33: YES), said document is the document directly prior to the final document in the duplex copy mode (S35: YES), and when said image is being formed at a position corresponding to the left set position of the cover sheet to match the image recorded on a normal recording sheet inserted between cover sheets with an image recorded on said cover sheet (S36: YES).

When either started timer 1 or timer 2 ends (S39: YES, or S40: YES), document transport stops (S41). The document is therefore stopped at either the left set position or right set position shown in FIG. 22(*a*).

Figure 7:
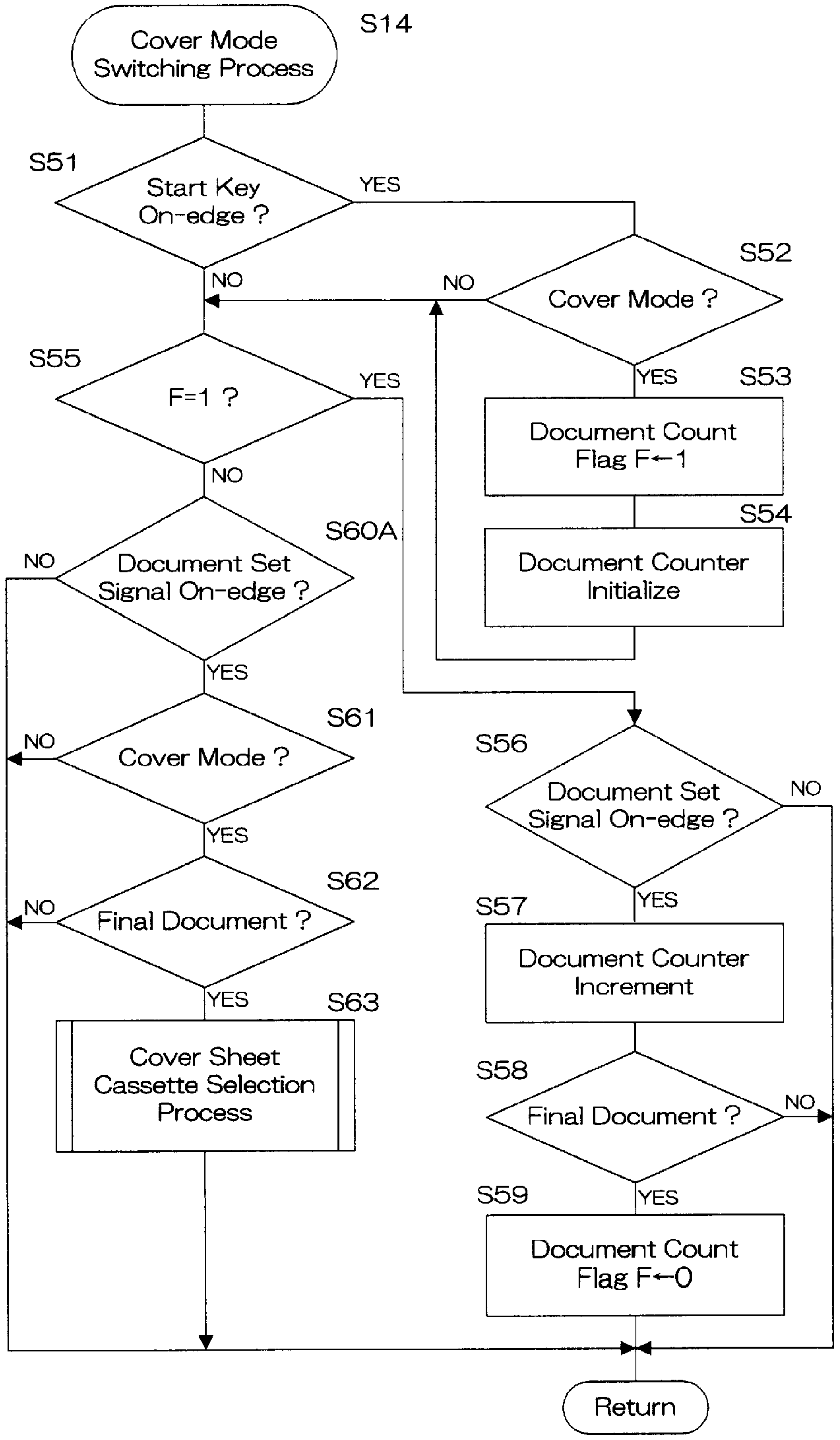
FIG. 7 is a flow chart showing the cover mode switching process in FIG. 5.
Figure 8:
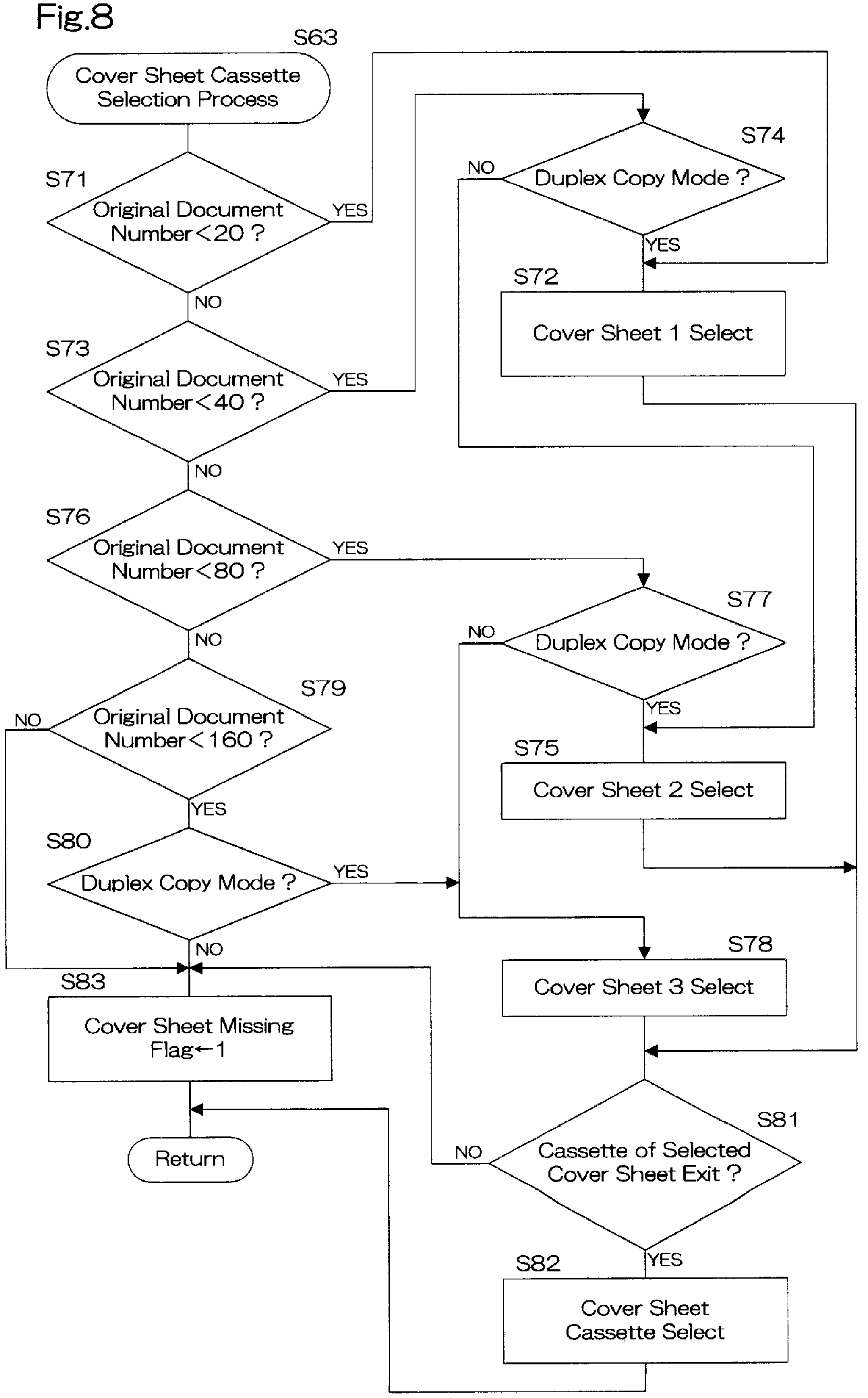
FIG. 8 is a flow chart showing the cover supply aperture selection process in FIG. 7.

(c) Cover Sheet Mode Switching Process (FIGS. 7 and 8)

When start key 96 is ON-edge (S51: YES) and the cover mode has been selected (S52: YES), a process is executed to feed the original documents in place to count the number of pages. That is, the document count flag F is set at [1] (S53) to initialize the document page count (S54).

If the document page count flag F is set at [1] to set the page count mode (S55: YES), when the document set signal ON-edge is detected indicating a document is placed at a predetermined position on document table 30 (S56: YES), the document count is incremented (S57), and a determination is made as to whether r not the set document is the final document (S58). As a result, if the set document is not the final document (S58: NO), the counter awaits the placement of the next document on document table 30. If the set document is the final document (S58: YES), the document count flag F is set at [0] (S59). That is, the document count mode is released.

When the document count mode ends, document transport is started for the next copy. (Document transport itself is controlled by CPU 45.) At this time, the document count flag F is set at [0] (S55: NO), and the processes of steps following step S60A are executed. Each time a document set signal is input (S60A: YES), the determinations of step S61 and S62 are made, the cover sheet move is set (S61: YES), and when the recording sheet to be fed is the final recording sheet (S62: YES), the cover sheet port selection process is executed (S63) since a cover sheet recording sheet is to be fed as the recording sheet.

The cover sheet port selection process (S63), selects the type (size) of cover sheet recording sheet in accordance with the number of document sheets, i.e., the thickness of one bound recording sheet set, as shown in FIG. 8.

For example, when the original document sheet count is less than 20 sheets (S71: YES), and the document sheet count is 20 or more but less than 40 in the duplex copy mode (S71: NO; and S73: YES; and S74: YES), cover sheet recording sheet 1 (refer to FIG. 19(*b*)) is selected (S72), and the port of the cassette accommodating said selected cover sheet recording sheet 1 is selected (S82).

When the number of document sheets is 20 or more but less than 40 and the duplex copy mode is not selected (S71: NO; and S73: YES; and S74: NO) and when the number of document sheets is 40 or more but less than 80 and the duplex copy mode has been selected (S73: NO; and S76: YES; and S77: YES), cover sheet recording sheet 2 having a size capable of accommodating the spine cover sheet area corresponding to the thickness (refer to FIG. 19(*b*)) is selected (S75) due to the thickness of the set of copy sheets to be bound, and therefore, the supply port of the cassette accommodating said selected cover sheet recording sheet 2 is selected (S82).

When the number of document sheets is 40 or more but less than 80 and the duplex copy mode has not been selected (S73: NO; and S76: YES; and S77: NO) and the number of document sheets is 80 or more but less than 160 and the duplex copy mode has been selected (S76: NO; and S79: YES; and S80: YES), cover sheet recording sheet 3 having a size capable of accommodating the spine cover sheet area corresponding to a greater thickness (refer to FIG. 19(*b*)) is selected (S78) due to the greater thickness of the set of copy sheets to be bound, and therefore, the supply port of the cassette accommodating said selected cover sheet recording sheet 3 is selected (S82).

When the number of document sheets is 160 or more (S79: NO) and when a cassette accommodating said selected cover sheet recording sheet is missing (S81: NO), the cover sheet missing flag is set at [1] (S83). A process may also be executed to display on the display panel a message indicating the missing cassette.

Figure 9:
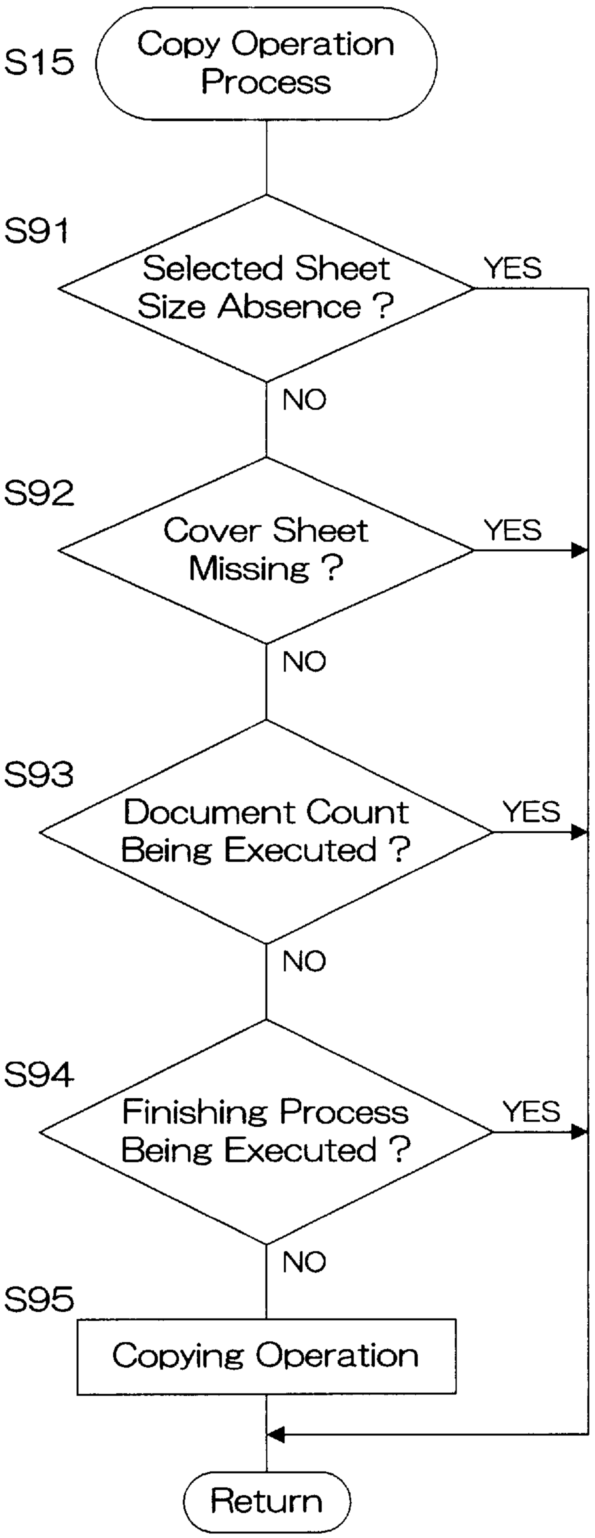
FIG. 9 is a flow chart showing the copy operation process in FIG. 5.
Figure 10:
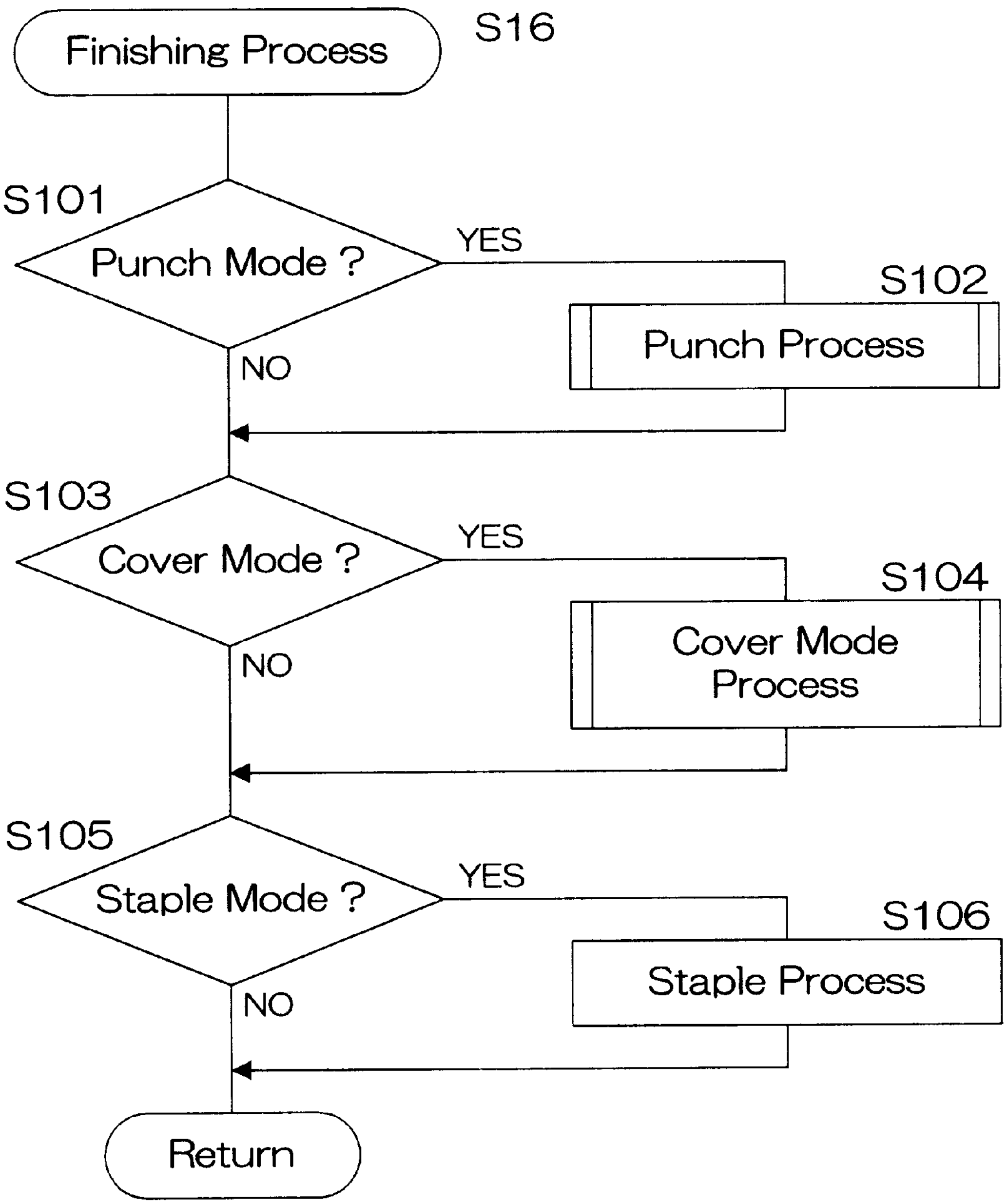
FIG. 10 is a flow chart showing the finishing process in FIG. 5.

(d) Copy Operation Process (FIG. 9

This process (S95) controls the copy operation sequence upon the conditions that the selected size recording sheet is present (S91: NO), the selected type cover sheet is present when the cover sheet mode has been selected (S92: NO), a document sheet count is not currently being executed (S93: NO), and a finishing process is not currently being executed (S94: NO).

(e) Finishing Process(FIGS. 10~18)

When the punch mode is set (S101: YES), the punch process is executed (S102). The process for punching holes in the magazine mode is executed within the punch process (S102). When the cover sheet mode is set (S103: YES), the cover sheet mode process is executed (S104). In the magazine mode, controls may be executed to fold the recording sheets at a center position in the sheet transport direction. In this instance, the controls of each recording sheet may be similar, for example, to the folding of cover sheet 1 in the cover sheet mode process (S103). Naturally, in the magazine mode controls may be executed so as to eject each recording sheet to tray 51 without folding said recording sheets. When the staple mode is set (S105: YES), the stapling process (S106) is executed to staple the recording sheet set placed in the stapler 50 (i.e., the recording sheet set interposed between the cover sheets when the cover sheet mode is jointly set).

The punch process (S102) and cover sheet mode process (S104) are described below.

(e-1) Punch Process (FIGS. 11 and 12(*a*)~12(*e*))

When a recording sheet fed from the copier body to finisher 40 is detected by sensor 46S disposed directly in front of punch unit 54 and the ON-edge status of the detection signal of said sensor 46S is detected (S111: YES), either one or two of the timers 3~7 which manage the timing to punch holes in said recording sheet is started, and when said timer ends (S123: YES) the holes are punched (S124). In the magazine mode process executed within the punch process, when the ON-edge state of the detection signal of said sensor 46S is detected (S111: YES), two timers among the timers 10~15 are started to manage the timing of the hole punching in the recording sheet, and when said two timers end (S123: YES) the holes are punched (S124).

For example, when the cover sheet mode is not set (S112: NO) and the magazine mode is not set (S125: NO), timer 3 is started to manage the time equivalent to the distance shown in FIG. 12 (*a*)(S118), and when said timer 3 ends (S123: YES) the hole punching operation is executed (S124).

When the left-opening cover sheet mode (refer to FIG. 22(*b*)) has been selected (S113: NO) and the cover sheet mode is not selected (S115: NO), timer 3 is started to manage the time equivalent to the distance shown in FIG. 12(*a*) (S118), and when said timer 3 ends (S123: YES) the hole punching operation is executed (S124).

When the left-opening cover sheet mode is selected (S113: NO) and the cover sheet is selected (S115: YES) and the cover sheet recording sheet 1 is selected (S116: YES), timers 3 and 5 are started to manage the time equivalent to the distance shown in FIG. 12(*c*) (S118, S120), and when the timers 3 and 5 end (S123: YES) the respective hole punching operations are executed (S124).

When the left-opening cover sheet mode is selected (S113: NO) and the cover sheet is selected (S115: YES) and cover sheet recording sheet 2 has been selected (S117: YES), timer 6 and 3 are started to manage the time equivalent to the distance shown in FIG. 12(*d*)(S121, S118), and when said timers 3 and 6 end (S123: YES) the respective hole punching operations are executed (S124).

When the left-opening cover sheet mode is selected (S113: NO) and the cover sheet is selected (S115: YS) and the cover sheet recording sheet 3 is selected (S117: NO), timers 7 and 3 are started to manage the time equivalent to the distance shown in FIG. 12(*e*) (S122, S118), and when said timers 3 and 7 end (S123: YES) the respective hole punching operations are executed (S124).

When the right-opening cover sheet mode is selected (refer to FIG. 22(*b*)) (S113: YES) and a cover sheet is not selected (S114: NO), the timer 4 is started to manage the time equivalent to the distance shown in FIG. 12(*b*) (S119). When timer 4 ends (S123: YES), the hole punching operation is executed (S124).

When the right-opening cover sheet mode is selected (S113: YES) and a cover sheet is supplied (S114: YES), processing is executed with is identical to that when a cover sheets 1~3 are supplied in the previously described left-opening cover sheet mode in accordance with whichever cover sheet 1~3 is supplied.

When the magazine mode is set in step S125, the hole punch process is executed as shown in FIG. 24. That is, the hole punching process is called (S128) after a recording sheet fed from the copier body to the finisher 40 is detected by sensor 46S disposed directly in front of said finisher 40 (S111: YES) when the cover sheet mode is not set (S112: NO) and the magazine mode is selected (S125: YES). In this hole punching process, the value of the timer controlling the hole punching operation is set in correspondence with the number of supplied recording sheets.

The hole punching process is described below with reference to FIG. 24.

For example, if eight pages of document images 1~8 are copied to both sides of two recording sheets A and B, and said recording sheets A and B are ejected sequentially to tray 51, timers 10 and 11 are set for recording sheet A (S305), and timers 12 and 13 are set for recording sheet B (S309). When each of the timers end (S123: YES) the respective hole punching operation is executed (S124). That is, holes are punched in recording sheet A at the locations shown in FIG. 25(*a*), and holes are punched in recording sheet B at the locations shown in FIG. 25(*b*) (S123: YES; and S124). Although not shown in FIG. 23, when three recording sheets are used,, timers 14 and 15 are set (S313), and holes are punched at the locations shown in FIG. 25(*c*).

Timers 10~15 manage the time from the leading edge of the recording sheet to the hole punch position; timer 10 manages the time from the leading edge of the recording sheet to position C, timer 11 manages the time to position A, timer 12 manages the time to position G, timer 13 manages the time to position E, timer 14 manages the time to position K, and timer 15 manages the time to position I, as shown in FIG. 25. The distances AB and BC, distances EF and FG, and distances IJ and JK are equal, and the relationship AB<EF<IJ obtains. Lines B'B, F'F, and J'J indicated by the dashed lines in the drawing represent the center fold lines.

Since the shift in position of the punched holes which occurs when the recording sheets are folded in the magazine mode due to the overlapping of a plurality of recording sheets can be compensated by adjusting the position of the punched holes in accordance with the number of recording sheets, the positional dislocation of the punched holes in the internal recording sheets shown in FIG. 26(*c*) is prevented such that the punched holes of each recording sheet are as shown in FIG. 26(*b*).

Although it is supposed that the position of the holes are shifted for each recording sheet when the set of said recording sheets is relatively thick as described above, the position of the punched holes may be shifted, for example, each tenth recording sheet when the set of recording sheets is relatively thin. That is, the position of the punched holes may be shifted each suitable number of recording sheets in accordance with the thickness of the recording sheet set. In addition, timer tables corresponding to the thickness of the recording sheet set may be prepared beforehand so as to switch timer tables in accordance with the thickness of the recording sheet set. The thickness of the recording sheet set may also be entered via operation panel OP, for example.

Although recording sheet B is ejected on top of recording sheet A in the above example, said recording sheets also may be ejected in reverse sequence. In this instance the direction of the shift in punched holes will also be reversed. That is, the position of the punched holes in the recording sheets in the interior area bound in the magazine mode are positioned relatively closer to the fold than the holes punched in the exterior recording sheets and, as a result, the positions of the punched holes in each recording sheet overlap when the recording sheets are folded for binding in the magazine mode.

(e-2) Cover Sheet Mode Process (FIGS. 13~19(*a*),19(*b*), 19(*c*),19(*d*))

(e-2-1) Right-Opening Cover Sheet Mode

In the right-opening cover sheet mode (S141: YES), switching member 42 is set at position B (refer to FIG. 19(*a*)) (S142). That is, recording sheets (a set of recording sheets) are prepared for transport from paper path α to paper path δ.

First, the finishing flag is cleared (S143: NO), and since not even one recording sheet passes sensor 41S (S145: NO), switching member 41 is set at position A (refer to FIG. 19(*a*)) (S148), and stopper 43 is turned ON (S149). The recording sheets are transported from paper path θ to paper path α, and said recording sheets collect in paper path α in preparation for binding.

When the aforesaid preparation ends, the recording sheets used for image formation are sequentially ejected from copier body 20 to finisher 40. As a result, the recording sheets (N (number of copies) minus 1) used for image formation (non-cover sheet recording sheets) accumulate within paper path α. The number of copies (N) is set based on the number of original documents and duplex copy/or not and a cover sheet. In this way the determination of step S145 of the next routine becomes [YES], and the process advances to step S146. In step S146, stopper 43 is turned OFF, and stopper 45 is turned ON. Then, in step S147, roller 44 is turned ON. Therefore, the recording sheets (N (number of copies) minus 1) used for image formation accumulated within paper path α are transported as a batch to paper path δ without being inverted front-to-back, and stop within paper path δ.

Next, the folding process (S164) is executed.

First, the passage of the recording sheets (set copy number) from copier body 20 past sensor 41S is awaited (S201).

When the cover sheet recording sheet passes sensor 41S (S201: YES), switching member 41 is set at position C (S202), roller 44 is turned OFF and roller 53 starts reverse rotation, and roller 48 starts forward rotation (S203A). That is, the cover sheet recording sheet temporarily transported within paper path α is retracted, inverted front-to-back, and inserted into paper path γ and advances into paper path ϵ.

When the trailing edge of the cover sheet recording sheet passes the position of sensor 41S and the detection signal changes to OFF-edge status (S204: YES), stopper 56 is set at a position corresponding to the selected type of cover sheet recording sheet (i.e., cover sheet 1, cover sheet 2, cover sheet 3) (S205~S209). That is, as shown in FIGS. 19(*b*),19(*c*),19(*d*), the position of stopper 56 is set such that the distance between stopper 56 and the fold in the cover sheet becomes A when cover sheet 1 is selected, said distance becomes B when cover sheet 2 is selected, said distance becomes C when cover sheet 3 is selected. The folds in cover sheets 2 and 3 are shown on the left side in the drawing. When stopper 56 is set at the aforesaid positions, the cover sheet is guided into paper path ϵ such that the leading edge of said cover sheet abuts the stopper 56, and the trailing edge of said cover sheet remains in paper path γ; the aforesaid fold is positioned above the nip between roller 48 and the right adjacent roller shown in FIG. 2.

When the trailing edge of the cover sheet passes the position of sensor 41S, the reverse-rotating roller 53 is stopped (S210A: YES; and S211). The forward rotation of roller 48 continues without stopping. Then, a determination is made as to whether or not cover sheet 1, or cover sheet 2 or cover sheet 3 is selected. As a result, when cover sheet 1 is selected (S212: YES), the cover sheet a process is executed to fold the cover sheet and insert the set of non-cover sheet recording sheets between the front cover and back cover of the folded cover sheet (two-fold operation) (S220, S221). When either cover sheet 2 or 3 is selected (S212: NO), the three-fold flag is set (S213), and the three-fold process is executed to fold cover sheet 2 or 3 with a left side fold as shown in FIGS. 19(*c*),19(*d*) (three-fold operation) (S215), then a process is executed for the aforesaid two-fold operation.

The aforesaid two-fold operation is described below when cover sheet 1 has been selected (S212: YES).

First, the three-fold flag is cleared (S216: NO). As previously described, when the leading edge of cover sheet 1 abuts stopper 56, sensor 44S is turned ON (S217: YES), and sensor 43S is ON to guide the set of recording sheets (non-cover sheets) into paper path δ and stop (S218: YES).

Therefore, the process continues to step S219 and subsequent steps. The finishing flag is set (S219), stopper 45 is turned OFF (S220), and rollers 48 and 52 are turned ON (S221). In this way the recording sheet set within paper path δ drops onto the cover sheet, and the cover sheet is folded at the dotted line region within cover sheet 1 shown in FIG. 19(*b*) (in the case of cover sheets 2 and 3 described later, the fold occurs at the region indicated by the dotted line on the right side in cover sheet 2 and 3), such that the set of recording sheets are enclosed within said cover sheet 1 and the complete set of both non-cover recording sheets and cover sheets is transported into paper path δ with the fold foremost. The two-fold operation is thus realized.

Although there is no need to start forward rotation of roller 48 in step S221 as previously described because said forward rotation was started in step S203A, roller 48 is turned ON in step S221 because roller 48 is stopped before the execution of step S221 when step S221 is executed after the three-fold process (S215) is executed in the case of cover sheets 2 and 3 to form the fold region indicated by the dotted line in cover sheets 2 and 3 in FIGS. 19(*c*),19(*d*).

The execution of the two-fold operation following the three-fold operation is described below since either cover sheet 2 or 3 is selected.

When cover sheet 2 or 3 is selected (S212: NO), the three-fold flag is cleared (S213). The three-fold flag is a flag preventing the execution of steps S220 and S221 until the end of the operation for folding the left side of cover sheet 2 or 3 shown in FIGS. 19S(*c*),19(*d*).

As previously described, forward rotation of roller 48 is started in step S203A, and said forward rotation is continued. Therefore, the cover sheets 2 or 3, the leading edge of which abuts the stopper 56, is pulled into the nip formed between roller 48 and the right adjacent roller in FIG. 2, such that the cover sheet 2 or 3 enters paper path ζ. That is, a fold is imparted at the left side in cover sheet 2 or 3 shown in FIGS. 19(*c*),19(*d*), and this fold enters first into paper path ζ.

When the fold of the cover sheet inserted into paper path ζ reaches sensor 48S, the detection signal changes to the ON-edge state (S252A: YES). At this moment, the finishing flag is cleared (S253A: NO). Therefore, reverse rotation of roller 548 starts (S254), and timer 8 or timer 9 are started (S56 or S261).

Timers 8 and 9 manage the continuous reverse rotation time of roller 48 so as to realize movement (return distance)

equivalent to the width of the spine within cover sheets 2 or 3 as shown in FIG. 19(*b*). That is a return of a distance equivalent to timer 8 or 9 is realized by stopping the reverse rotation of roller 48 when timer 8 or 9 ends (S257: YES). The timing of the end of timer 8 or 9 (S257: YES) clears the three-fold flag (S258).

When the three-fold flag is cleared the determination is step S216 is [NO], and the process for the previously described two-fold operation, i.e., steps S220 and S221, is executed. In this way the set of recording sheets within paper path 6 drop onto cover sheet 2 or 3 so as to impart a fold at the right side of cover sheet 2 or 3 as shown in FIG. 19(*b*) and insert the set of recording sheets in cover sheet 2 or 3 and enter paper path ζ. Since this process was described previously, it is not discussed further.

The right-opening cover sheet mode process is executed in the aforesaid manner.

Left-Opening Cover Sheet Mode

The left-opening cover sheet mode is described below. In the left-opening cover sheet mode (S141: NO), the set of recording sheets (non-cover sheet) are temporarily accommodated in paper path β, and subsequently inverted front-to-back and guided into paper path δ, in contrast to the previously described right-opening cover sheet mode, wherein a set of recording sheets (non-cover sheets) are fed from paper path a to paper path δ without front-to-back inversion.

First, the finishing flag is cleared (S144: NO), and since not even one recording sheet passes sensor 41S (S150: NO), switching member 41 is set at position A (refer to FIG. 19(*a*) (S162), and stopper 43 is turned ON (S163). That is preparations are made to feed recording sheets from paper path θ to paper path a so as to accumulate said recording sheets in paper path α.

When the aforesaid preparation ends, the recording sheets used for image formation are sequentially ejected from copier body 20 to finisher 40. As a result, the recording sheets (number of copies minus 1) used for image formation (non-cover sheet recording sheets) accumulate within paper path α. In this way the determination of step S150 of the next routine becomes [YES], and the process advances to step S155. First, the reverse rotation flag is not set (S155: NO). Therefore, the routine advances to step S151 and subsequent steps, stopper 43 is turned OFF, and stopper 45 is turned ON (S151), then roller 44 is turned ON (S152), and switching member 42 is set at position A (S153), and the reverse rotation flag is set (S154). Therefore, the set of recording sheets (number of copies minus 1) used for image formation accumulated within paper path a are transported as a batch to paper path β.

When the set of recording sheets is transported into paper path β and the trailing edge passes the position of sensor 42S, i.e., when the detection signal of sensor 42S is changed to the OFF-edge state (S156: YES) by the setting of the reverse rotation flag (S155: YES), if switching member 42 is at position A (S157: YES), roller 46 starts reverse rotation (S158), and switching member 42 is set at position C (S159). In this way the set of recording sheets collected in paper path β are inverted front-to-back, and guided into paper path δ, and stopped within paper path δ.

When the set of recording sheets are inverted front-to-back and transported from paper path β to paper path δ, and the trailing edge passes the position of sensor 42S, i.e., when the detection signal of sensor 42S is changed to the OFF-edge state (S156: YES) by the setting of the reverse rotation flag (S155: YES), if switching member 42 is not at position A (S157: NO), roller 46 is stopped (S160), and the reverse rotation flag is cleared (S161).

The left-opening cover sheet mode process is therefore accomplished as described above. The folding process (S164) is identical to the insert process described in the right-opening cover sheet mode process.

Although the means for detecting the number of document sheets in the present embodiment has been described in terms of automatic counting by feeding of the documents in place using the RDH 10 before copying the documents, it is to be noted that the number of documents may be entered directly via the operation panel OP.

Although the example of a binding device in a copying apparatus has been used in the present embodiments, the present invention is also applicable to the binding device in printers, facsimiles and the like. In this instance, the document image is input from an external device such as a computer, image forming apparatus or the like, and data concerning the number of documents, and data specifying the cover sheet mode and the like are transmitted from said external device.

The present invention is capable of cleanly binding documents even when the set of recording sheets is thick because the cover sheet can be folded in three folds comprising a front cover sheet, spine cover sheet, and back cover sheet.

The present invention is capable of cleanly binding documents in accordance with the thickness of the set of recording sheets to be bound by selecting a cover sheet mode in accordance with the number of document sheets (i.e., thickness of the document set) because the cover sheets may be folded in a two-fold cover sheet comprising a front cover sheet and back cover sheet, and a three-fold cover sheet comprising a front cover sheet, spine cover sheet, and back cover sheet.

The present invention is further capable of cleanly binding a document set in accordance with the thickness of the set of recording sheets to be bound by punching holes at suitable positions in accordance with the number of document sheets (i.e., thickness of the set of recording sheets).

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus which finishes recording sheets on which images are printed, comprising:

a punch unit disposed at a predetermined position in the sheet transport path, punching holes in said recording sheets with an operation timing; and a punch control device controlling the operation timing of said punch unit so as to punch holes in an outside record location from holes punched in an inside recording sheet, when said sheets are folded in two.

2. The image forming apparatus as claimed in claim 1, wherein said punch control device controls the operation timing such that the position of the holes in the inside recording sheet is nearer to a fold in the sheets than the position of the holes in the outside recording sheet.

3. An image forming apparatus as claimed in claim 1, further comprising:

a setting device setting a magazine mode on which two pages of a document image are printed on a left portion and a right portion of the inside and outside recording sheets, wherein said punch control device operates when said magazine mode is set.

4. An image forming apparatus which finishes recording sheets on which images are printed, comprising:

a punch unit disposed at a predetermined position in a sheet transport path, punching holes in the recording sheets with a specified operation timing; and a punching control device controlling the operation timing of said punch unit so as to punch holes at different positions of each predetermined number of sheets.

5. An image forming apparatus as claimed in claim 4, wherein said punching control device controls the operation timing of said punch unit based on a thickness of the sheet.

6. A finisher, comprising:

a punch unit disposed at a predetermined position in a sheet transport path, punching holes in said recording sheets with a operation timing; and a punch control device controlling the operation timing of said punch unit so as to punch holes in an outside sheet at a different location from holes punched in an inside sheet, when said sheets are folded in two.

7. A finisher, comprising:

a punch unit disposed at a predetermined position in a sheet transport path, punching holes in the sheets with a specified operation timing; and a punching control device controlling the operation timing of said punch unit so as to punch holes at different positions of each predetermined number of sheets.

* * * * *